(12) United States Patent
Naka et al.

(10) Patent No.: US 11,843,300 B2
(45) Date of Patent: Dec. 12, 2023

(54) LINEAR MOTOR, TRANSPORT APPARATUS, AND PRODUCTION APPARATUS

(71) Applicant: Canon Kabushiki Kaisha, Tokyo (JP)

(72) Inventors: Masaharu Naka, Chiba (JP); Norihiro Suzuki, Kanagawa (JP); Satoru Deguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 17/119,209

(22) Filed: Dec. 11, 2020

(65) Prior Publication Data

US 2021/0099067 A1    Apr. 1, 2021

Related U.S. Application Data

(63) Continuation of application No. PCT/JP2019/023109, filed on Jun. 11, 2019.

(30) Foreign Application Priority Data

Jun. 12, 2018  (JP) .................................. 2018-112135
Jun. 7, 2019   (JP) .................................. 2019-107411

(51) Int. Cl.
*H02K 41/03*  (2006.01)
*H02P 6/00*   (2016.01)
*H02K 7/06*   (2006.01)

(52) U.S. Cl.
CPC .............. *H02K 41/031* (2013.01); *H02K 7/06* (2013.01); *H02P 6/006* (2013.01)

(58) Field of Classification Search
CPC ...... H02K 41/031; H02K 41/03; H02K 35/02; H02K 33/16; H02P 6/006; B65G 23/23; B65G 23/22

(Continued)

(56) References Cited

U.S. PATENT DOCUMENTS

| 2002/0053835 A1 | 5/2002 | Joong et al. |
| 2003/0141769 A1 | 7/2003 | Kubo |

(Continued)

FOREIGN PATENT DOCUMENTS

| CN | 102986124 A | 3/2013 |
| JP | S62-203550 A | 9/1987 |

(Continued)

OTHER PUBLICATIONS

International Search Report issued in corresponding parent International Application No. PCT/JP2019/023109 dated Aug. 13, 2019.

(Continued)

*Primary Examiner* — Michael Andrews
(74) *Attorney, Agent, or Firm* — Venable LLP

(57) ABSTRACT

The disclosed linear motor includes a stator having a plurality of cores and coils that excite the plurality of cores, respectively, and a movable element having a permanent magnet and configured to move using electromagnetic force applied from the stator as driving force, each of the plurality of cores has an excitation unit wound with the coil and an acting unit configured to be magnetically coupled to the excitation unit and cause a magnetic flux applied from the excitation unit to work on the permanent magnet of the movable element, and the linear motor includes an airgap or a heat conduction reduction portion between the excitation unit and the acting unit, and the heat conduction reduction portion reduces heat conduction from the excitation unit to the acting unit more than in a case where the excitation unit and the acting unit are in direct contact with each other.

6 Claims, 22 Drawing Sheets

(58) Field of Classification Search
USPC .............................. 310/12.01–12.11, 12.33
See application file for complete search history.

(56) References Cited

U.S. PATENT DOCUMENTS

| | | | | |
|---|---|---|---|---|
| 2004/0080727 A1* | 4/2004 | Emoto | ................ | G03F 7/70858 |
| | | | | 355/75 |
| 2009/0033165 A1* | 2/2009 | Yamakata | ............. | H02K 37/04 |
| | | | | 310/46 |
| 2015/0188399 A1* | 7/2015 | Fukasawa | ............ | H02K 41/031 |
| | | | | 310/12.11 |
| 2022/0294326 A1* | 9/2022 | Guddei | ................ | H02K 41/031 |

FOREIGN PATENT DOCUMENTS

| | | | |
|---|---|---|---|
| JP | 2002142439 A | 5/2002 | |
| JP | 2003224961 A | 8/2003 | |
| JP | 2009005516 A | 1/2009 | |
| JP | 2013-034385 A | 2/2013 | |
| JP | 2013034385 A | 2/2013 | |
| JP | 2015-213394 A | 11/2015 | |
| JP | 2015213394 A | 11/2015 | |
| JP | 2018-078668 A | 5/2018 | |
| KR | 2012-0102435 A | 9/2012 | |
| KR | 20120102435 A | 9/2012 | |
| WO | 2015056847 A1 | 4/2015 | |
| WO | WO-2015056847 A1 * | 4/2015 | .............. B60L 13/04 |

OTHER PUBLICATIONS

International Preliminary Report on Patentability (IPRP) dated Dec. 24, 2020 in corresponding International Application No. PCT/JP2019/023109.
Korean Office Action dated Sep. 22, 2022 in counterpart Korean Patent Appln. No. 10-2020-7035227.
Chinese Office Action dated Jun. 2, 2023 in counterpart Chinese Patent Appln. No. 201980039278.0.

* cited by examiner

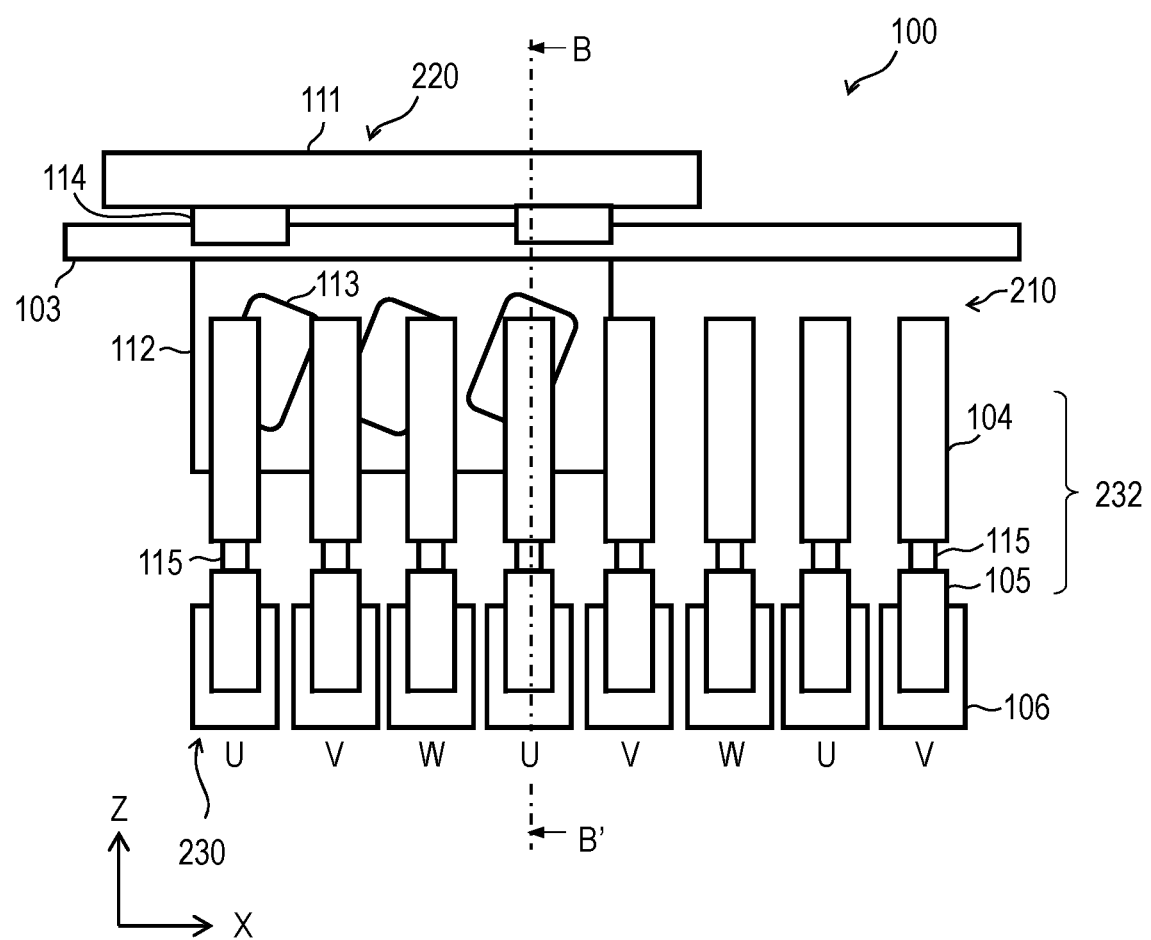

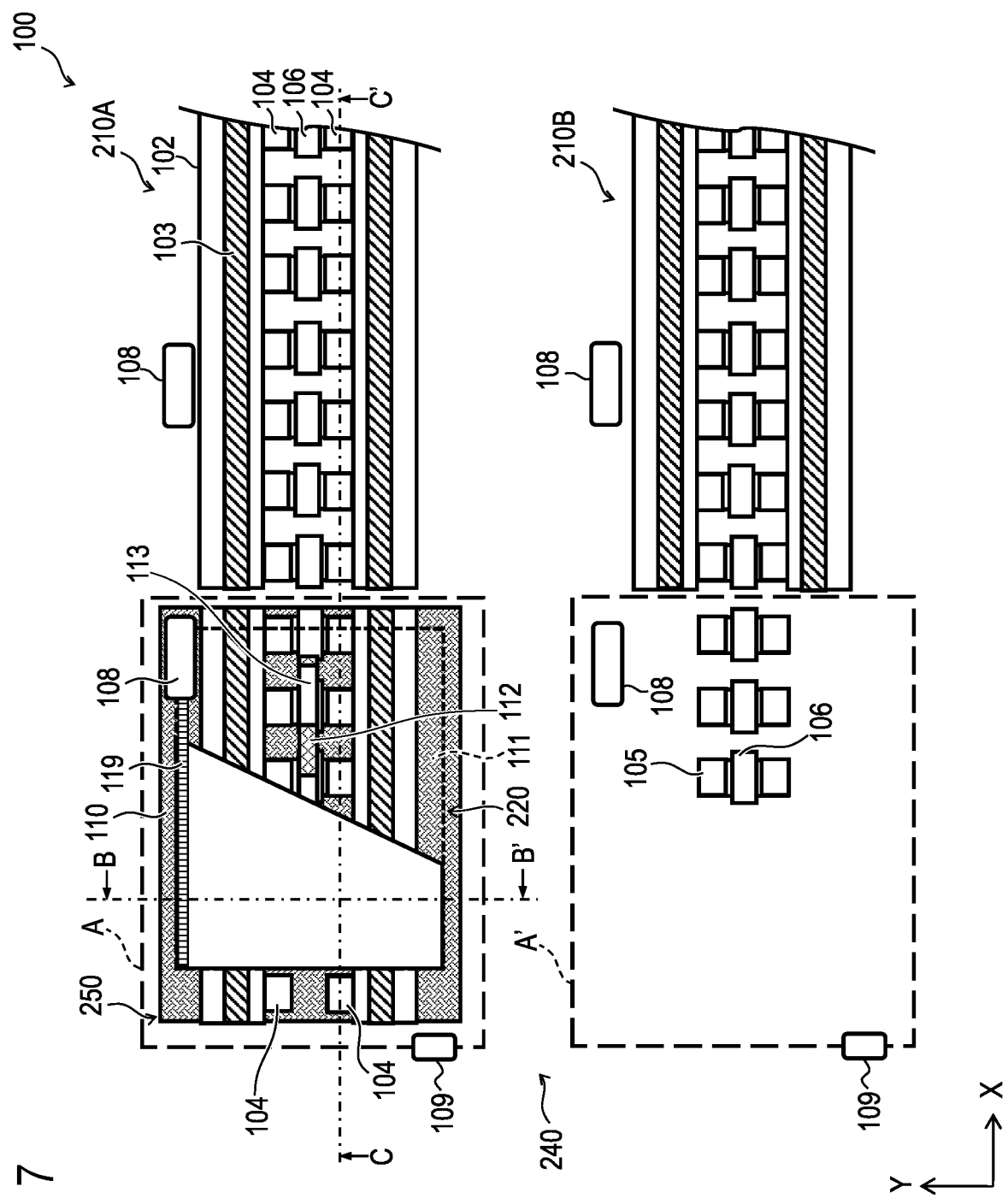

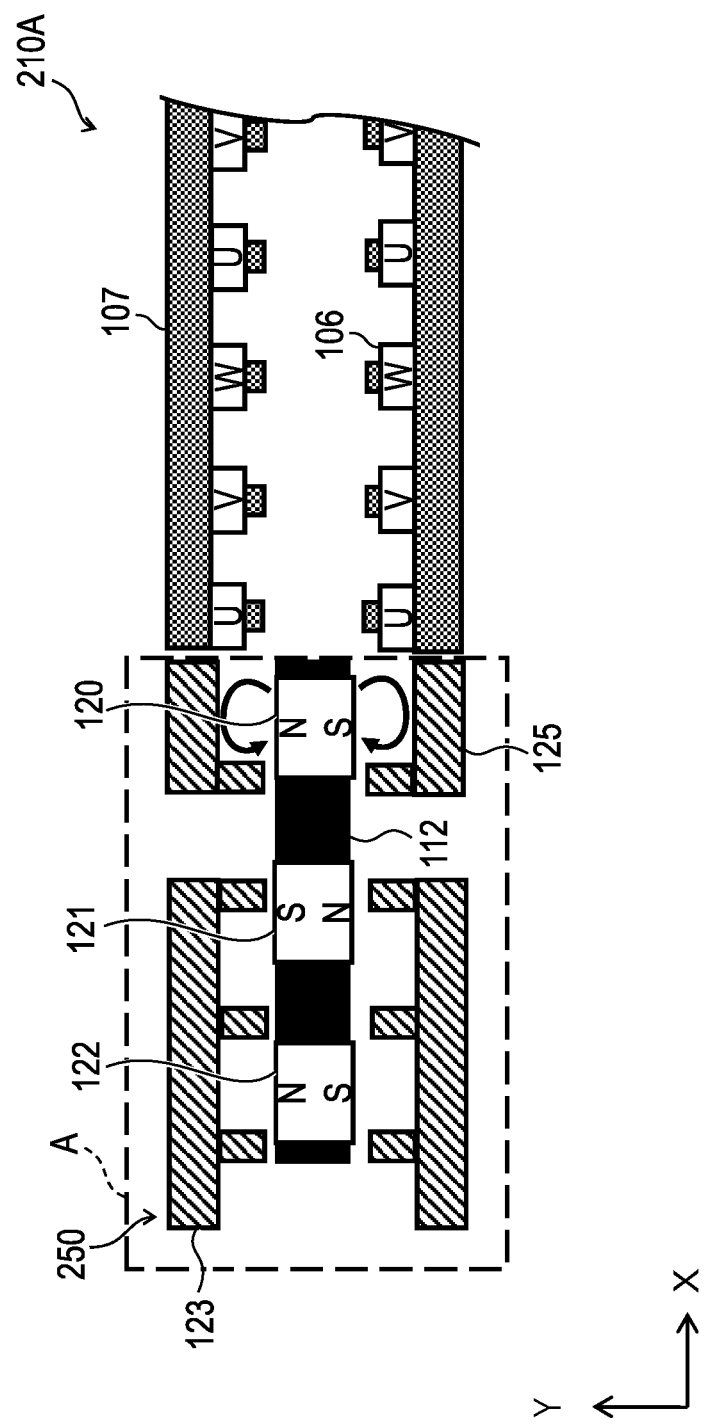

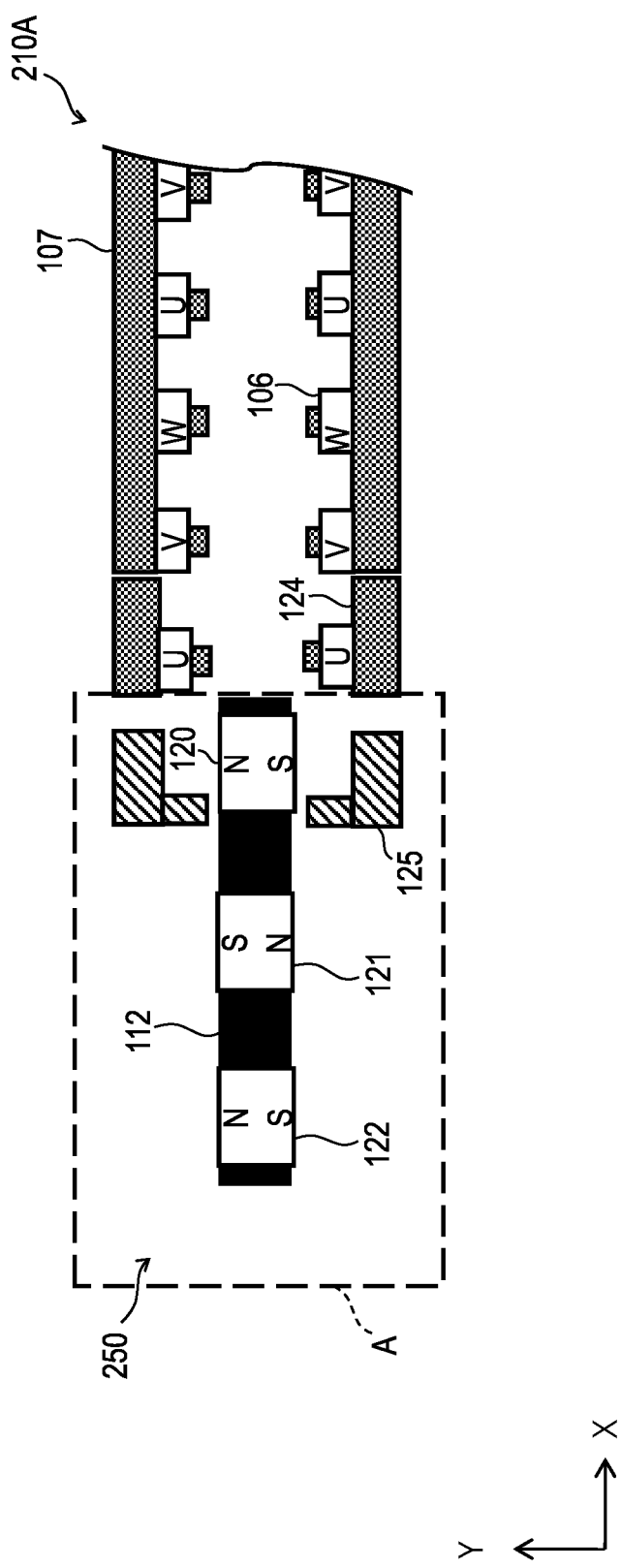

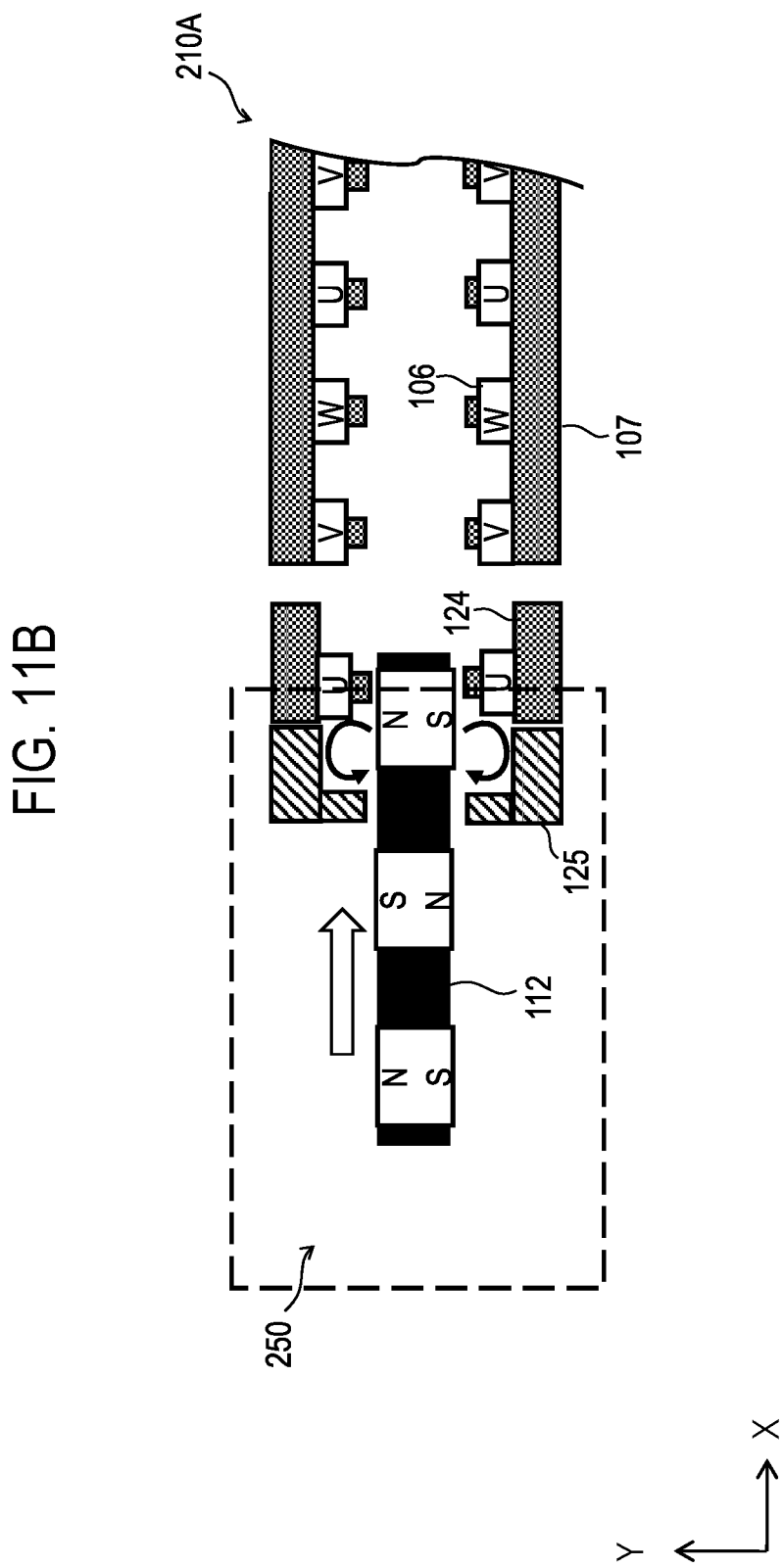

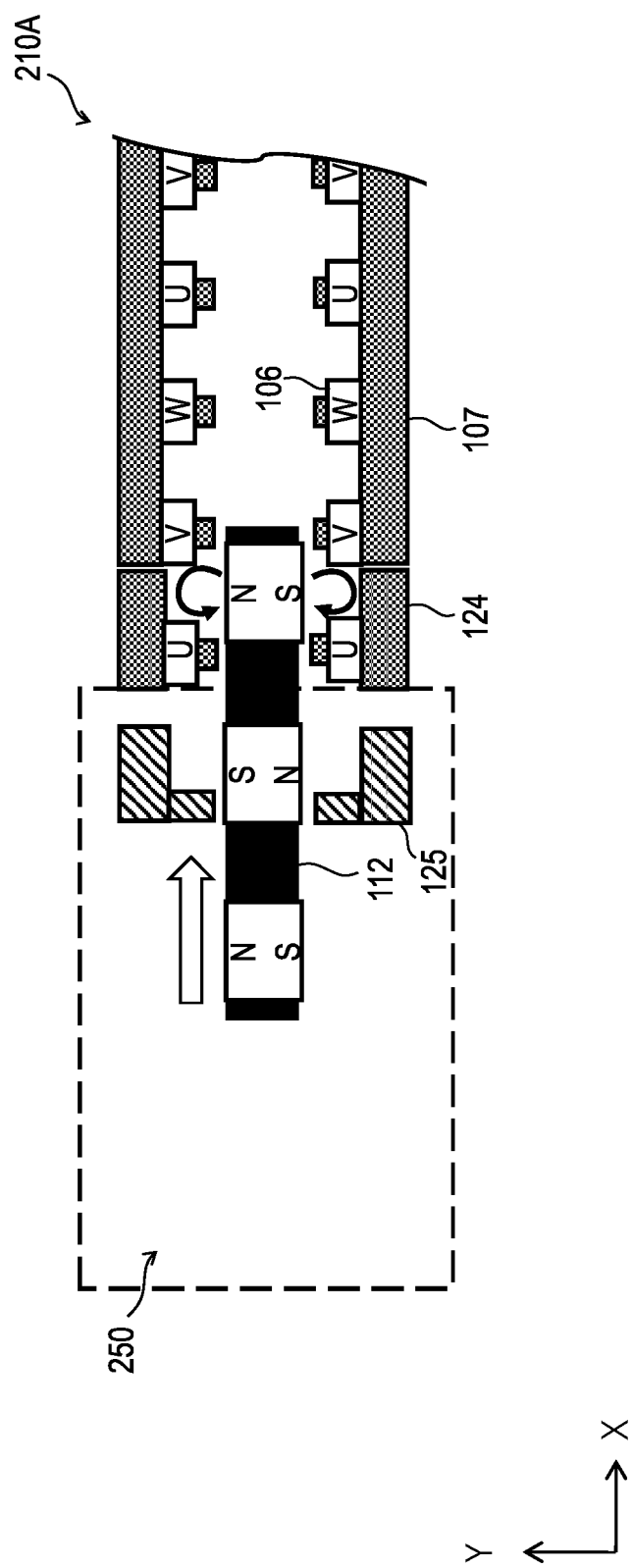

LINEAR MOTOR, TRANSPORT APPARATUS, AND PRODUCTION APPARATUS

CROSS-REFERENCE TO RELATED APPLICATIONS

This application is a Continuation of International Patent Application No. PCT/JP2019/023109, filed Jun. 11, 2019, which claims the benefit of Japanese Patent Application No. 2018-112135, filed Jun. 12, 2018 and Japanese Patent Application No. 2019-107411, filed Jun. 7, 2019, the contents of which are hereby incorporated by reference herein in their entirety.

BACKGROUND OF THE INVENTION

Field of the Invention

The present invention relates to a linear motor, a transport apparatus, and a production apparatus.

Description of the Related Art

A transport apparatus using a moving magnet type linear motor in which magnets are used on a movable element side and coils are used on a stator side does not require connection of a motive power cable on the movable element side and therefore enables long-stroke transportation. Further, such transport apparatuses have no backrush and have high positioning accuracy and repeatability compared to ball screw type transport apparatuses and thus have been used in a high speed transport apparatus used for manufacturing lines for precision instruments. Related arts are disclosed in, e.g., Japanese Patent Application Laid-Open No. 2002-142439 and Japanese Patent Application Laid-Open No. 2009-005516.

In a moving magnet type linear motor, however, a plurality of coils serving as a stator are arranged along a track on which a movable element travels, and controlled drive current is supplied to driving coils to magnetically drive the movable element. Thus, the coils supplied with current in driving generate heat due to Joule heat. In the moving magnet type linear motor, since coils that are heat sources are arranged closer to permanent magnets of a movable element than in the ball screw type transport apparatus, such a linear motor is likely to be affected by a temperature change of the coils. Thus, there is a limit in obtaining precise positioning performance or positioning repeatability. Further, there is a problem of increased fluctuation of a transport speed or inclination of a movable element.

Furthermore, when a circulation type transport apparatus is formed by using a moving magnet type linear motor, a cableveyor (registered trademark) is required for a connection cable used for driving a movable track unit, and generation of dust or disconnection of a cable may occur due to sliding or bending of the connection cable. Thus, suppression of generation of dust is a challenge in application to a manufacturing line for precision instruments.

SUMMARY OF THE INVENTION

One of the objects of the present invention is to provide a compact linear motor and a compact transport apparatus that can suppress influence due to heat generated from coils and realize accurate positioning performance, accurate positioning repeatability, and accurate transport performance. Further, another object of the present invention is to provide a transport apparatus suitable for application to a manufacturing line for precision instruments.

According to one aspect of the present invention, provided is a linear motor including a stator including a plurality of cores and coils that excite the plurality of cores, respectively, and a movable element including a permanent magnet and configured to move using electromagnetic force applied from the stator as driving force, each of the plurality of cores includes an excitation unit wound with each of the coils and an acting unit configured to be magnetically coupled to the excitation unit and cause a magnetic flux applied from the excitation unit to work on the permanent magnet of the movable element, and the linear motor further includes an airgap or a heat conduction reduction portion between the excitation unit and the acting unit, wherein the heat conduction reduction portion reduces heat conduction from the excitation unit to the acting unit more than in a case where the excitation unit and the acting unit are in direct contact with each other.

Further, according to another aspect of the present invention, provided is a transport apparatus including a first transport module forming a stationary track unit, a shifter unit including a second transport module forming a movable track unit and a first movable mechanism that causes the second transport module to move to a first position where the second transport module is connected to the first transport module, and a carriage including a permanent magnet and configured to move using electromagnetic force applied from the first transport module or the second transport module as driving force, and the second transport module includes an acting unit, which is configured to be magnetically coupled to an excitation unit including a coil when the second transport module is located at the first position, and is configured to cause a magnetic flux applied from the excitation unit to work on the permanent magnet of the carriage via the acting unit.

Further, according to another aspect of the present invention, provided is a production apparatus including a stator, a movable element including a permanent magnet, and a chamber, the stator has a plurality of cores and coils that excite the plurality of cores, respectively, each of the plurality of cores includes an excitation unit wound with each of the coils and an acting unit configured to be magnetically coupled to the excitation unit and cause a magnetic flux applied from the excitation unit to work on the permanent magnet of the movable element, the coil and the excitation unit are arranged outside the chamber, and the acting unit is arranged inside the chamber.

Further features of the present invention will become apparent from the following description of exemplary embodiments with reference to the attached drawings.

BRIEF DESCRIPTION OF THE DRAWINGS

FIG. 2B is a sectional view illustrating a general configuration of the transport apparatus according to the second embodiment of the present invention.

FIG. 7 is a top view illustrating a general configuration of a transport apparatus according to a sixth embodiment of the present invention.

FIG. 10 is a schematic diagram illustrating the structure of cores of the transport module in the transport apparatus according to the seventh embodiment of the present invention.

FIG. 11A is a schematic diagram illustrating the structure and operation of a core of a transport module in the transport apparatus according to an eighth embodiment of the present invention.

FIG. 11B is a schematic diagram illustrating the structure and operation of the core of the transport module in the transport apparatus according to the eighth embodiment of the present invention.

FIG. 11C is a schematic diagram illustrating the structure and operation of the core of the transport module in the transport apparatus according to the eighth embodiment of the present invention.

DESCRIPTION OF THE EMBODIMENTS

Preferred embodiments of the present invention will now be described in detail in accordance with the accompanying drawings.

First Embodiment

Figure 1A:
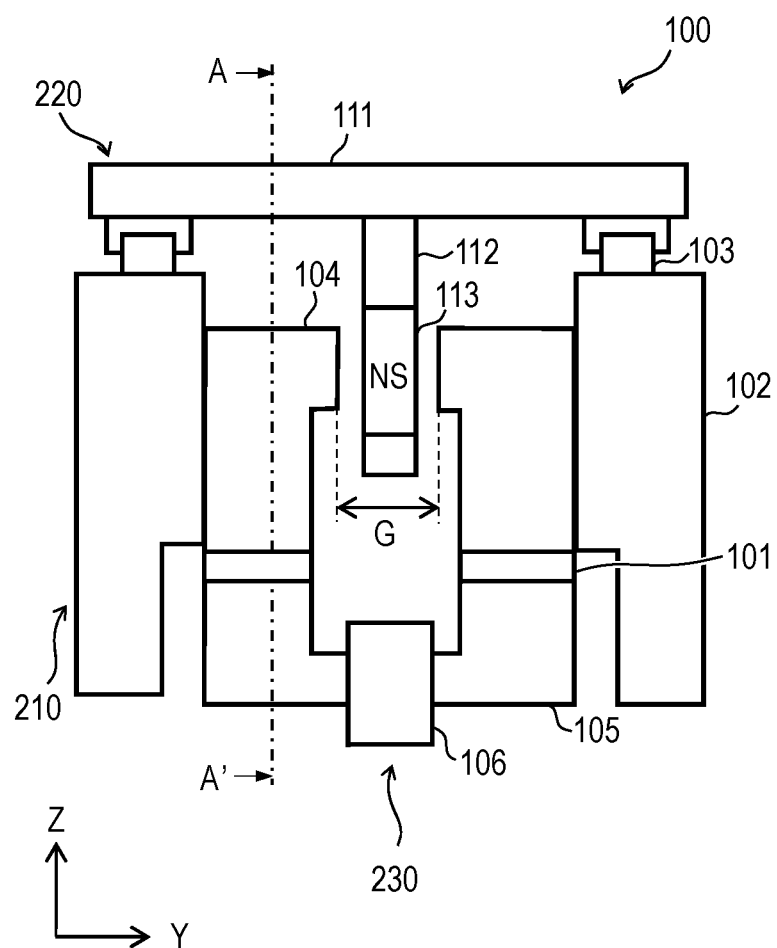
FIG. 1A is a sectional view illustrating a general configuration of a transport apparatus according to a first embodiment of the present invention.
Figure 1B:
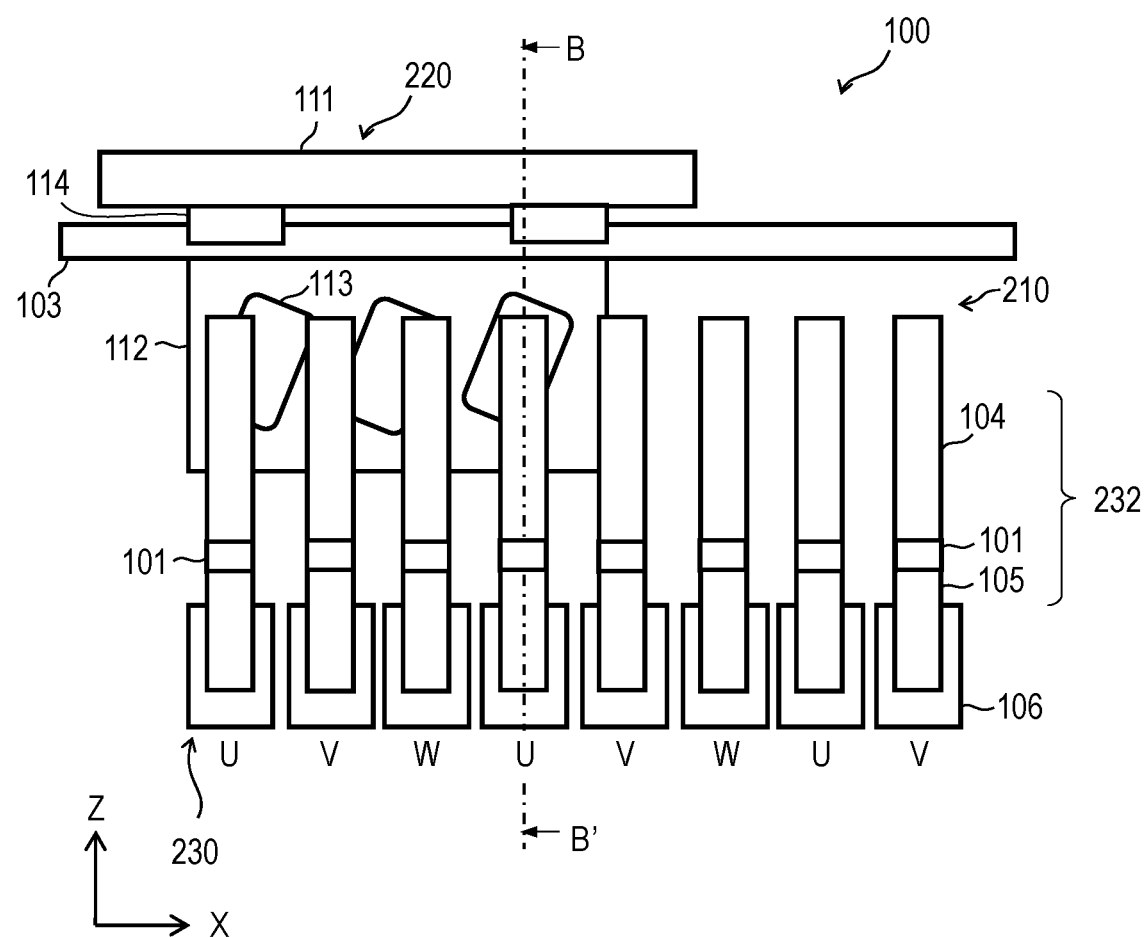
FIG. 1B is a sectional view illustrating a general configuration of the transport apparatus according to the first embodiment of the present invention.

A transport apparatus according to a first embodiment of the present invention will be described with reference to FIG. 1A and FIG. 1B. FIG. 1A and FIG. 1B are sectional views illustrating a general configuration of the transport apparatus according to the present embodiment.

A transport apparatus 100 according to the present embodiment is a transport apparatus that causes a carriage to travel by using a movable magnet linear motor (a moving magnet type linear motor, a movable field system type linear motor) and thereby transports a workpiece. The transport apparatus 100 has a transport module 210 and a carriage 220 as illustrated in FIG. 1A and FIG. 1B, for example.

The transport module 210 forms a track unit (transport path) on which the carriage 220 travels. Herein, for the purpose of illustration below, coordinate axes are defined for the transport apparatus 100. First, the X-axis is defined in the moving direction of the carriage 220 that moves horizontally. Further, the Z-axis is defined in the perpendicular direction. Further, the Y-axis is defined in the direction orthogonal to the X-axis and the Z-axis. The definition of coordinate axes is the same also in the subsequent embodiments. Note that FIG. 1A is a sectional view in a plane parallel to the Y-Z plane including a line B-B' of FIG. 1B. Further, FIG. 1B is a sectional view in a plane parallel to the X-Z plane including a line A-A' of FIG. 1A.

The transport module 210 has linear stands 102, a plurality of core units 230, and a linear guide rails 103. The core units 230 and the linear guide rail 103 are fixed to the linear stands 102.

The plurality of core units 230 are arranged in a predetermined interval along the moving direction (X-axis direction) of the carriage 220 and form a stator of the linear motor. Each of the plurality of core units 230 has a core 232 and a coil 106. The core 232 has an excitation-side core 105, a pair of acting-side cores 104 provided at both ends of the excitation-side core 105, and thermal insulation portions 101 provided between the acting-side cores 104 and the excitation-side core 105. Note that, although FIG. 1B illustrates the transport module 210 having eight core units 230 arranged in the X-axis direction for simplified illustration of the drawing, the transport module 210 has a necessary number of core units 230 for forming a linear motor of any length in the actual implementation.

The pair of the acting-side cores 104 are arranged to face each other spaced apart from a core gap G and connected and fixed to the linear stands 102. The excitation-side core 105 is connected to the acting-side cores 104 via the thermal insulation portions 101 and arranged so as not to be directly connected to the linear stands 102. The material of the acting-side core 104 and the excitation-side core 105 is not particularly limited, and a magnetic material such as stacked silicon steel plates may be applied thereto, for example.

The coil 106 is wound around the excitation-side core 105 of the core 232 and has a role of exciting the core 232. The acting-side cores 104 are arranged so as to be magnetically coupled to the excitation-side core 105, are subjected to a magnetic flux generated by the excitation-side core 105, and cause this magnetic flux to work on the movable element arranged in the core gap G. The thermal insulation portion 101 functions as a heat conduction reduction portion that reduces heat conduction from the excitation-side core 105 to the acting-side core 104 more than in a case where the excitation-side core 105 and the acting-side core 104 are in direct contact with each other.

Note that, in this specification, the excitation-side core 105 or the excitation-side cores 105 of the cores 232 forming the plurality of core units 230 may be collectively referred to as an excitation unit. Further, the acting-side core 104 or the acting-side cores 104 of the cores 232 forming the plurality of core units 230 may be collectively referred to as an acting unit.

The carriage 220 forms a movable element of the linear motor and has a top plate 111, a magnet support 112, a permanent magnet 113, and linear guide blocks 114. The linear guide blocks 114 are provided at four corners on the under surface of the top plate 111 so as to be connected to the linear guide rails 103 when the carriage 220 is installed on the transport module 210. Thereby, the carriage 220 is supported by the transport module 210 so as to be movable in the X-axis direction along the linear guide rails 103. The magnet support 112 is fixed to the center part on the under surface of the top plate 111 such that the permanent magnet 113 is located in the core gap G between the acting-side cores 104 when the carriage 220 is installed on the transport module 210. Note that FIG. 1B illustrates a case as an example where an arbitrary skew angle (for example, 20 degrees) is provided to the magnet support 112 having the same thickness as the permanent magnet 113 and three permanent magnets 113 are fixed such that the magnetic poles of adjacent permanent magnets 113 are opposite alternately.

Each of the coils 106 of the plurality of core units 230 is supplied with predetermined current under the control of an upper-level controller (not illustrated). Each of the coils 106 of the plurality of core units 230 can be driven in three-phase alternating current made of a U-phase, a V-phase, and a W-phase as labeled with "U", "V", and "W" in FIG. 1B, for example. When current is applied to the coil 106, the permanent magnet 113 of the carriage 220 is subjected to electromagnetic force as driving power from the coil 106 via the excitation-side core 105 and the acting-side cores 104. In such a way, the carriage 220 obtains driving force and travels on a track unit formed of the linear guide rails 103. By appropriately controlling current flowing in each of the coils 106 of the plurality of core units 230, it is possible to cause the carriage 220 to travel or stop and thereby control the position of the carriage 220 on the transport module 210.

In the moving magnet type linear motor, a plurality of coils serving as a stator are arranged along the track on which a movable element travels, and the movable element is magnetically driven by conduction of controlled drive current to the driving coil. Thus, the conducted coil generates heat during driving due to Joule heat. In the moving magnet type linear motor, since coils that become heat sources are arranged closer to permanent magnets of the movable element than in the ball screw type transport apparatus, the moving magnet type linear motor is likely to be affected by a temperature change of the coils. For example, when the temperature around the permanent magnet changes due to generated heat of the coil, the permanent magnet is demagnetized by thermal energy, and motor thrust may decrease. Thus, the distance between the coil and the permanent magnet of the movable element is required to be increased, and the size of the apparatus increases. Further, if heat of the coil is transferred to a casing or a stand and causes thermal expansion, the position of the sensor arranged in the casing or the stand may change, and this causes a reduction in positioning accuracy.

In this regard, in the transport apparatus according to the present embodiment, each of the cores 232 of the core unit 230 forming the stator of the linear motor is formed of the acting-side cores 104, the excitation-side core 105, and the thermal insulation portions 101 arranged therebetween as described above. With such a configuration, heat conduction between the excitation-side core 105 and the acting-side cores 104 can be suppressed. Further, since the excitation-side core 105 is not directly connected to the linear stands 102, heat of the excitation-side core 105 is not transferred to the acting-side cores 104 via the linear stands 102. Accordingly, it is possible to effectively suppress heat generated by current flowing in the coil 106 from being transferred to the acting-side cores 104 via the excitation-side core 105 and realize a transport apparatus that can achieve accurate positioning repeatability even with a compact apparatus as a whole.

As the material forming the thermal insulation portion 101, a magnetic material having lower thermal conductivity and larger magnetic permeability than the material forming the acting-side core 104 and the excitation-side core 105 is desirable. In terms of the above, for example, permalloy, supermalloy, pure iron, amorphous alloy, permendur, sendust, or the like may be preferably used for the material forming the thermal insulation portion 101.

The temperature difference ΔT of the thermal insulation portion 101 between the acting-side core 104 side and the excitation-side core 105 side is expressed by Equation (1) below, where the thermal conductivity of the material forming the thermal insulation portion 101 is denoted as λ [W/m K], the cross-sectional area thereof is denoted as S [m2], the thickness thereof is denoted as L [m], and the amount of heat transfer of the excitation-side core 105 is denoted as w [W].

$$\Delta T = L/S \times w/\lambda \tag{1}$$

When the thermal insulation portion 101 is made of permalloy, the temperature difference between the excitation-side core 105 and the acting-side core 104 is 18 K when the amount of heat transfer of the excitation-side core 105 is 50 W, the cross-sectional area of the thermal insulation portion 101 is 0.0004 m2, the thickness thereof is 0.005 m, and the thermal conductivity of permalloy is 14 W/m K. When the overall core 232 is formed of stacked silicon steel plates, the length of the core 232 is required to be twice for obtaining the same effect. Therefore, with application of the present embodiment, it is possible to realize a reduction in the size of the core unit 230 of the linear motor and therefore the transport apparatus 100.

Note that, in the present embodiment, heat conduction from the excitation-side core 105 to the acting-side core 104 is suppressed by changing the thermal conductivity λ and the thickness L of the thermal insulation portion 101 with the cross-sectional area of the core 232 being maintained even. However, the cross-sectional area of the core 232 is not necessarily required to be even, and heat conduction from the excitation-side core 105 to the acting-side core 104 may be further reduced by selectively reducing the cross-sectional area in the thermal insulation portion 101.

The magnetic resistance R [A/wb] occurring due to the thermal insulation portion 101 is expressed as Equation (2) below, where the cross-sectional area of the thermal insulation portion 101 is denoted as S [m2], the thickness thereof is L [m], and the relative magnetic permeability thereof is μ.

$$R = 1/\mu \times L/S \tag{2}$$

When the thermal insulation portion 101 is formed of permalloy, since the relative magnetic permeability of the thermal insulation portion 101 is 14 times, the magnetic resistance R of the thermal insulation portion 101 is 1/14, and thus an increase in the magnetic resistance R can be suppressed. However, since the saturation magnetic flux density of permalloy is smaller than that of stacked silicon steel plates forming the acting-side core 104 and the excitation-side core 105, the motor is driven in a range of a magnetic flux that is smaller than the saturation magnetic flux density of permalloy.

Note that, although the T-shape structure in which two pairs of a coil and a magnet face each other has been illustrated as a linear motor in the present embodiment, the present embodiment is also applicable to the I-shape structure in which a pair of a coil and a magnet in which a thermal insulation structure can be arranged in the core part is employed.

As described above, according to the present embodiment, it is possible to reduce transfer of heat generated by the coil 106 to the acting-side core 104 via the excitation-side core 105. Accordingly, it is possible to suppress influence of heat generated by the coil 106 without increasing the size of the core unit 230 and realize a transport apparatus that can achieve accurate positioning repeatability even with a compact apparatus as a whole.

Second Embodiment

Figure 2A:
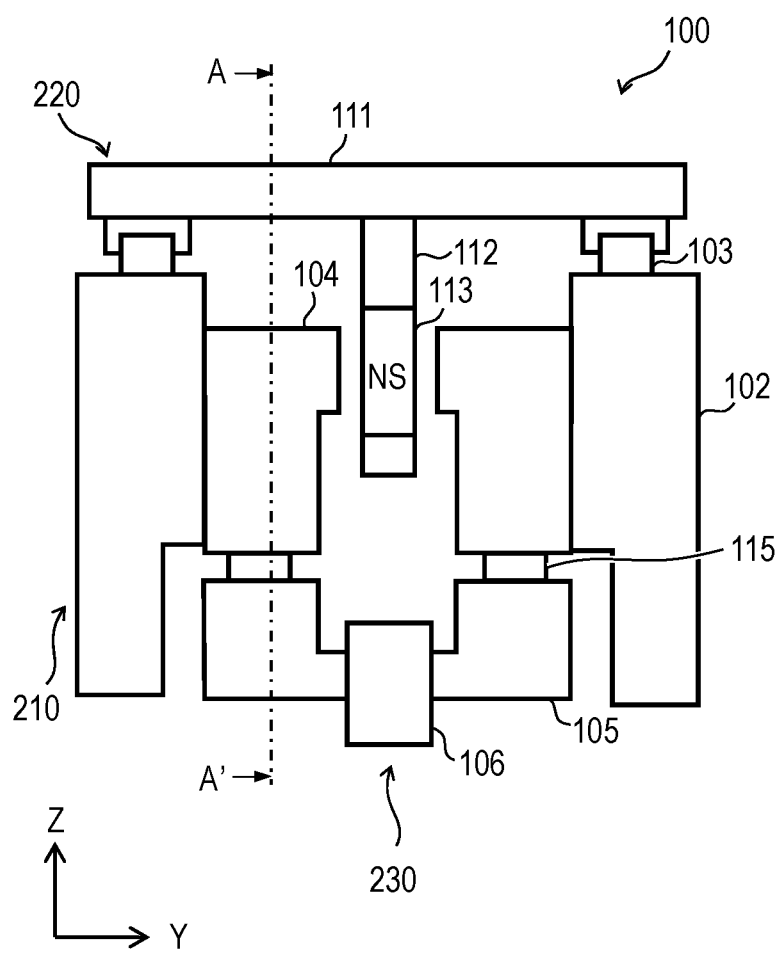
FIG. 2A is a sectional view illustrating a general configuration of a transport apparatus according to a second embodiment of the present invention.

The transport apparatus according to a second embodiment of the present invention will be described with reference to FIG. 2A and FIG. 2B. The same components as those in the transport apparatus according to the first embodiment are labeled with the same references, and the description thereof will be omitted or simplified. FIG. 2A and FIG. 2B are sectional views illustrating a general configuration of the transport apparatus according to the present embodiment. FIG. 2A is a sectional view in a plane parallel to the Y-Z plane including a line B-B' of the FIG. 2B. Further, FIG. 2B is a sectional view in a plane parallel to the X-Z plane including a line A-A' of the FIG. 2A.

As illustrated in FIG. 2A and FIG. 2B, the transport apparatus 100 according to the present embodiment is the same as the transport apparatus according to the first embodiment except for a difference in the configuration of each core 232 of the core unit 230 of the linear motor. That is, in the transport apparatus 100 according to the present embodiment, the core 232 of the core unit 230 is formed of the acting-side cores 104, the excitation-side core 105, and narrow portions 115 arranged therebetween. In the same manner as the thermal insulation portion 101 of the first embodiment, the narrow portion 115 functions as a heat conduction reduction portion that reduces heat conduction from the excitation-side core 105 to the acting-side core 104 more than in a case where the excitation-side core 105 and the acting-side core 104 are in direct contact with each other.

Although the narrow portion 115 is formed of the same material as that of the acting-side core 104 and the excitation-side core 105, the cross-sectional area of the cross section in a direction perpendicular to a magnetic flux passing inside the core 232 is smaller than that of the acting-side core 104. The minimum value of the cross-sectional area of the narrow portion 115 can be defined as a cross-sectional area by which a magnetic flux generated by the coil 106 is not saturated, for example. Although it is desirable that the narrow portions 115 be structured integrally with the acting-side cores 104 and the excitation-side core 105, the narrow portions 115 may be formed by coupling component members that are different from the acting-side cores 104 and the excitation-side core 105.

The temperature difference ΔT between the acting-side core 104 and the excitation-side core 105 can be increased by reducing the cross-sectional area S of the narrow portion 115 as illustrated in Equation (1). For example, it is assumed that the amount of heat transfer w of the excitation-side core 105 is 50 W, the thermal conductivity of a silicon steel plate is 30 W/m K, and the thickness of the narrow portion 115 is 0.005 m. In this case, if the cross-sectional area S of the narrow portion 115 is 0.0004 m2 that is the same as the cross-sectional area of the acting-side core 104, for example, the temperature difference ΔT between the excitation-side core 105 and the acting-side core 104 will be 20 K. On the other hand, if the cross-sectional area S of the narrow portion 115 is reduced to 0.0003 m2, the temperature difference ΔT between the excitation-side core 105 and the acting-side core 104 can be increased to 27 K. That is, by providing the narrow portions 115, it is possible to reduce heat conduction between the acting-side core 104 and the excitation-side core 105.

As described above, according to the present embodiment, it is possible to reduce transfer of heat generated by the coil 106 to the acting-side core 104 via the excitation-side core 105. Accordingly, it is possible to suppress influence of heat generated by the coil 106 without increasing the size of the core unit 230 and realize a transport apparatus that can achieve accurate positioning repeatability even with a compact apparatus as a whole.

Third Embodiment

Figure 3A:
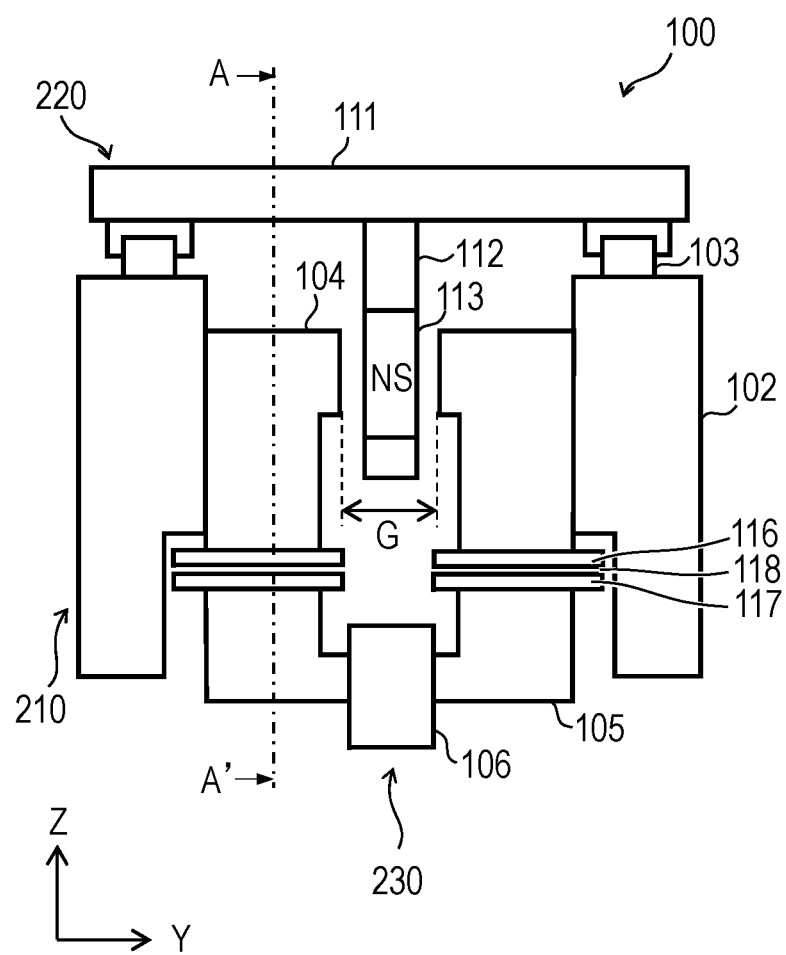
FIG. 3A is a sectional view illustrating a general configuration of a transport apparatus according to a third embodiment of the present invention.
Figure 3B:
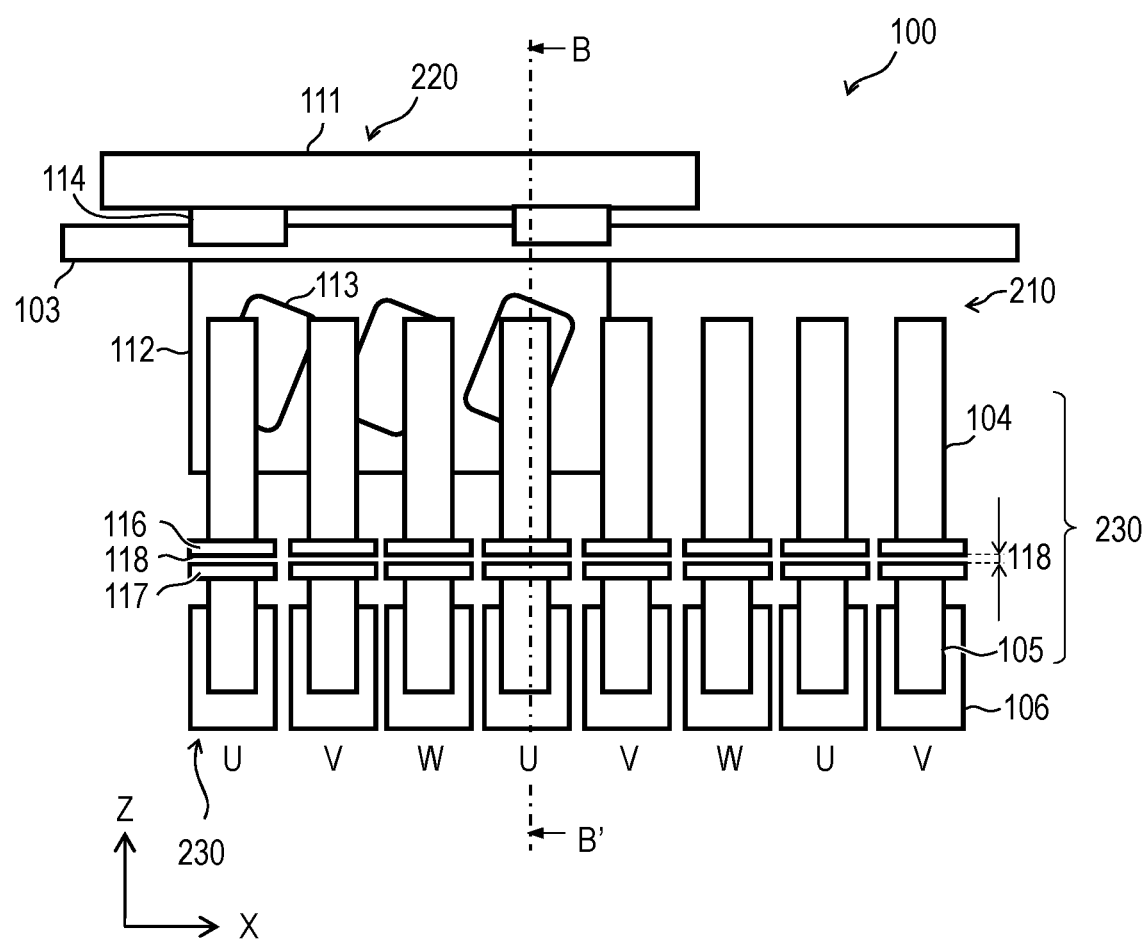
FIG. 3B is a sectional view illustrating a general configuration of the transport apparatus according to the third embodiment of the present invention.

The transport apparatus according to a third embodiment of the present invention will be described with reference to FIG. 3A and FIG. 3B. The same components as those in the transport apparatus according to the first and second embodiments are labeled with the same references, and the description thereof will be omitted or simplified. FIG. 3A and FIG. 3B are sectional views illustrating a general configuration of the transport apparatus according to the present embodiment. FIG. 3A is a sectional view in a plane parallel to the Y-Z plane including a line B-B' of the FIG. 3B. Further, FIG. 3B is a sectional view in a plane parallel to the X-Z plane including a line A-A' of the FIG. 3A.

As illustrated in FIG. 3A and FIG. 3B, the transport apparatus 100 according to the present embodiment is the same as the transport apparatus according to the first and second embodiments except for a difference in the configuration of each core 232 of the core unit 230 of the linear motor. That is, in the transport apparatus 100 according to the present embodiment, the core 232 of the core unit 230 is formed of the acting-side cores 104 and the excitation-side core 105, and airgaps 118 are provided therebetween. That is, the airgap 118 is provided in the middle of a magnetic path. The cross-sectional area of the end of the acting-side core 104 (an acting-side core end 116) and the cross-sectional area of the end of the excitation-side core 105 (an excitation-side core end 117) facing each other and interposing the airgap 118 are larger than the cross-sectional area of other portions in order to suppress leakage of the magnetic flux in the airgap 118. In the example of FIG. 3A and FIG. 3B, to enhance a thermal insulation effect between the acting-side cores 104 and the excitation-side core 105, the airgaps 118 are provided at both ends of the excitation-side core 105.

Since the airgap 118 includes an air layer arranged between the acting-side core 104 and the excitation-side core 105, the thermal conductivity is around 1/1000 times that of the thermal insulation portion 101 of the first embodiment or the narrow portion 115 of the second embodiment. Therefore, as is apparent from Equation (1), heat conduction between the acting-side core 104 and the excitation-side core 105 can be reduced more than in the case of the first and second embodiments. That is, in the same manner as the thermal insulation portion 101 of the first embodiment or the narrow portion 115 of the second embodiment, the airgap 118 functions as a heat conduction reduction portion that reduces heat conduction from the excitation-side core 105 to the acting-side core 104 more than in a case where the excitation-side core 105 and the acting-side core 104 are in direct contact with each other.

The magnetic resistance of the core gap G through which the permanent magnet 113 passes is 25 A/wb when the length of the core gap G is 0.01 m, the cross-sectional area thereof is 0.0004 m2, and the relative magnetic permeability thereof is 1. On the other hand, the magnetic resistance R of the airgap 118 is 0.25 A/wb when the length of the airgap 118 is 0.001 m, the cross-sectional area thereof is 0.004 m2, and the relative magnetic permeability thereof is 1. That is, the magnetic resistance of the airgap 118 is around 1/100 of the magnetic resistance of the core gap G. Therefore, the magnetic resistance of the entire core due to the airgap 118 being provided is increased by around 1%, which does not much affect the motor drive. It is preferable that the length of the airgap be greater than or equal to 1/20 and less than or equal to 1/3 of the length of the core gap.

Further, to obtain the advantageous effect of suppressing an increase in the magnetic resistance, the material described in the first embodiment having a larger magnetic permeability than the core material can be applied as the material of the acting-side core end 116 and the excitation-side core end 117.

As described above, according to the present embodiment, it is possible to reduce transfer of heat generated by the coil 106 to the acting-side core 104 via the excitation-side core 105. Accordingly, it is possible to suppress influence of heat generated by the coil 106 without increasing the size of the core unit 230 and realize a transport apparatus that can achieve accurate positioning repeatability even with a compact apparatus as a whole.

Fourth Embodiment

Figure 4:
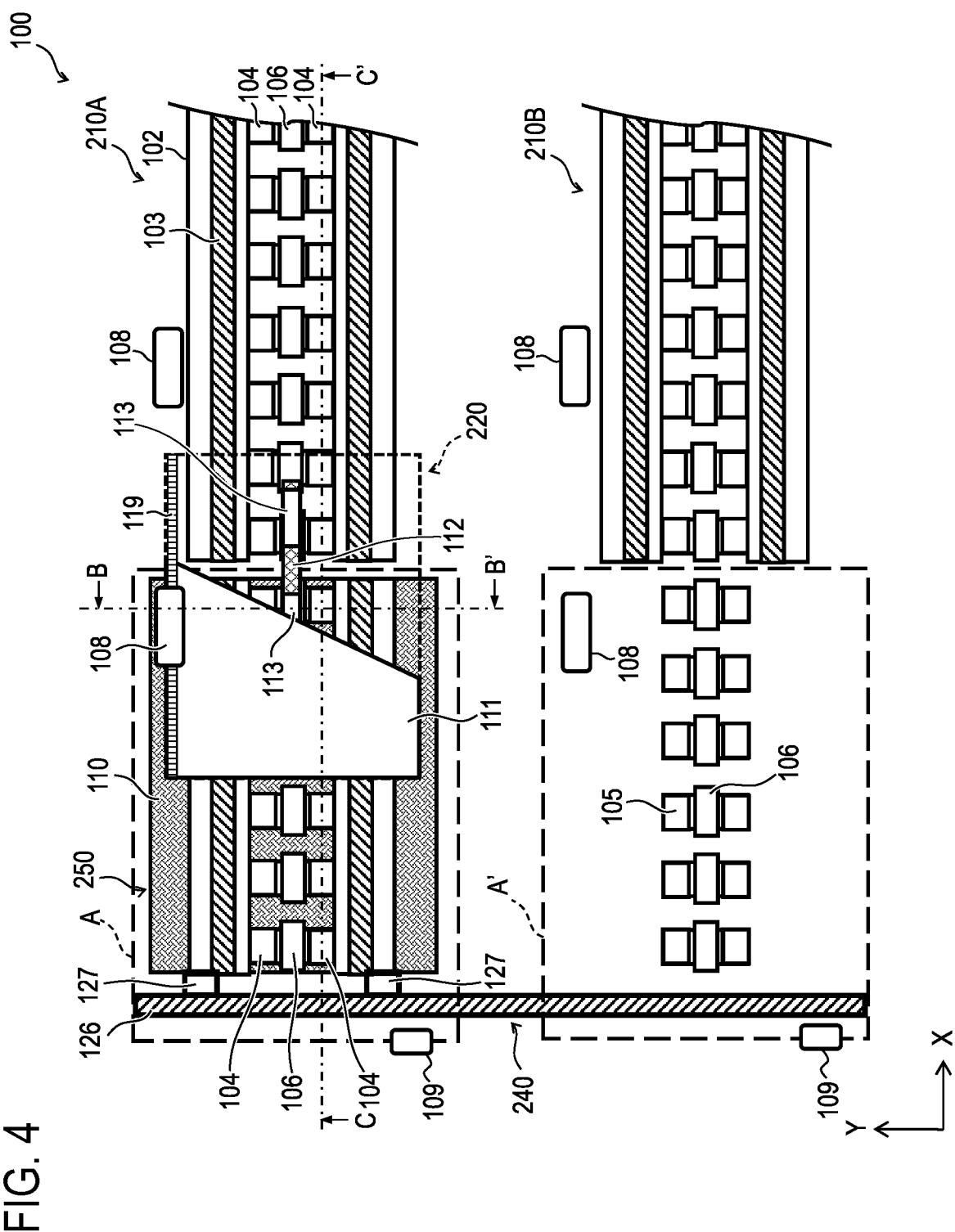
FIG. 4 is a top view illustrating a general configuration of a transport apparatus according to a fourth embodiment of the present invention.
Figure 5A:
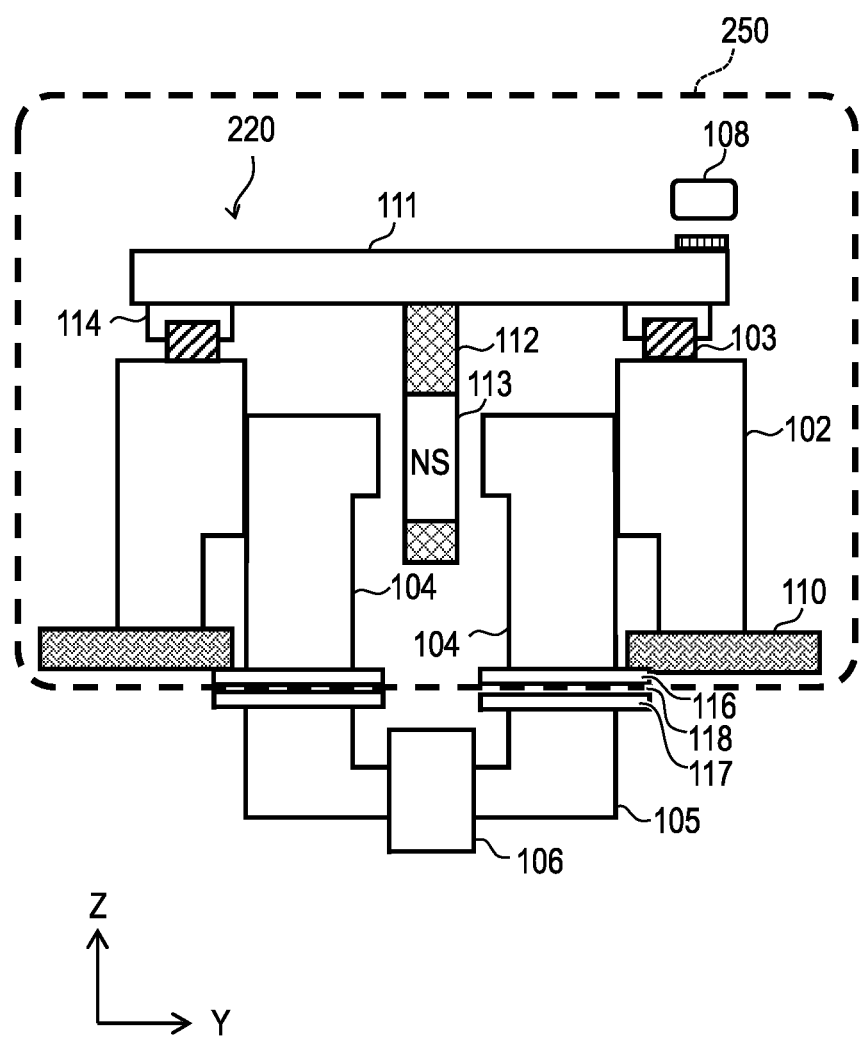
FIG. 5A is a sectional view illustrating a general configuration of a transport apparatus according to the fourth embodiment of the present invention.
Figure 5B:
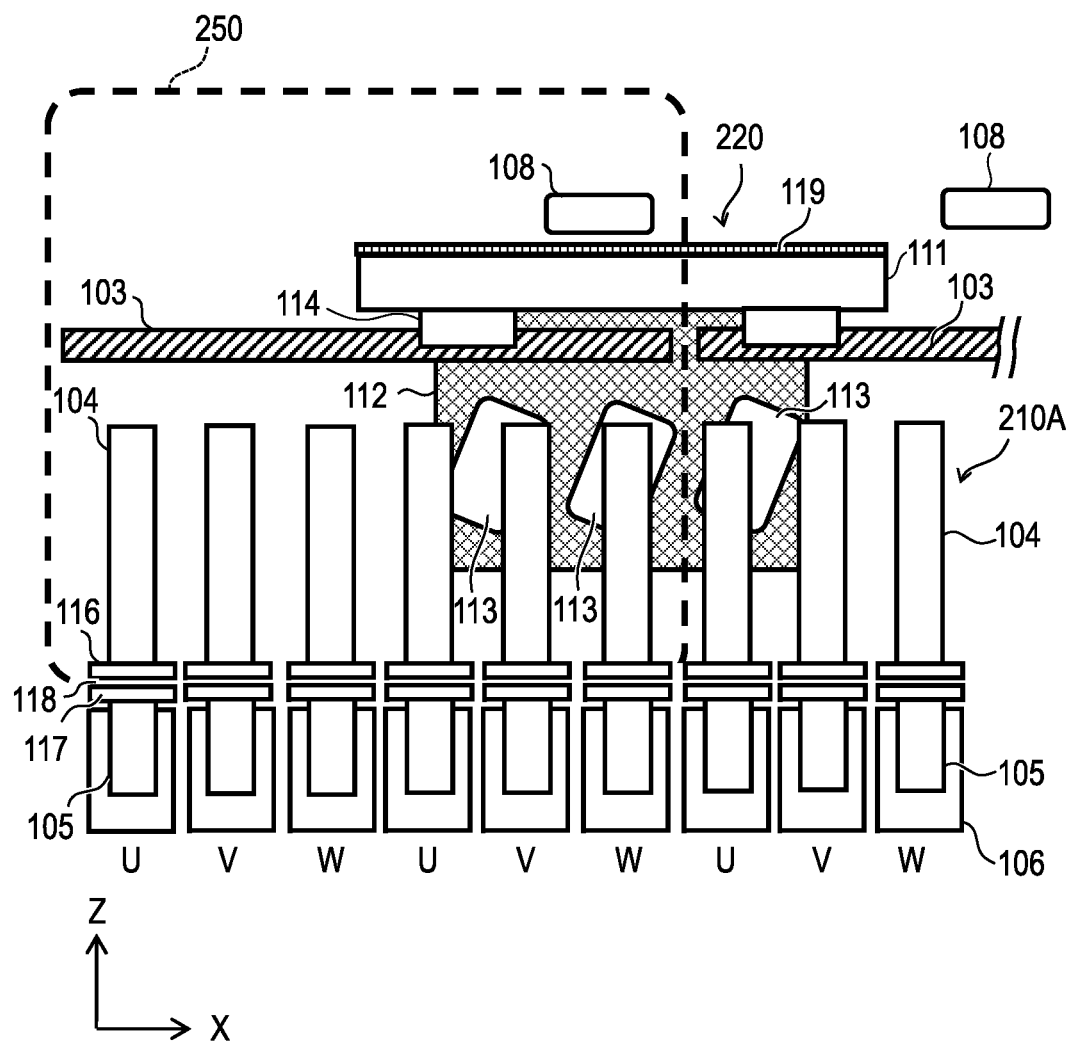
FIG. 5B is a sectional view illustrating a general configuration of the transport apparatus according to the fourth embodiment of the present invention.

The transport apparatus according to a fourth embodiment of the present invention will be described with reference to FIG. 4 to FIG. 5B. The same components as those in the transport apparatus according to the first to third embodiments are labeled with the same references, and the description thereof will be omitted or simplified. FIG. 4 is a top view illustrating a general configuration of the transport apparatus according to the present embodiment. FIG. 5A and FIG. 5B are sectional views illustrating a general configuration of the transport apparatus according to the present embodiment. FIG. 5A is a sectional view in a plane parallel to the Y-Z plane including a line B-B' of the FIG. 4. Further, FIG. 5B is a sectional view in a plane parallel to the X-Z plane including a line C-C' of the FIG. 4.

In the present embodiment, a configuration example to which the linear motor of the third embodiment is applied to a circulation type transport apparatus will be described. The circulation type transport apparatus is a transport apparatus on which a movable mechanism having shifter structure that reciprocates a movable track unit in a plane direction so as to be able to move back and forth between a forward track and a reverse track, elevator structure that reciprocates a movable track unit vertically, or the like is mounted.

The transport apparatus 100 according to the present embodiment has transport modules 210A and 210B, a shifter unit 240, and the carriage 220, as illustrated in FIG. 4 to FIG. 5B.

The transport modules 210A and 210B are the same as the transport module 210 illustrated in the third embodiment. The transport module 210A forms a stationary track unit for a forward path, for example. The transport module 210B forms a stationary track unit for a reverse path, for example. The transport module 210A and the transport module 210B are arranged such that the track units thereof are parallel to each other in the X-axis direction.

The shifter unit 240 has a transport module 250, a guide rail 126, guide blocks 127. The transport module 250 is fixed to the guide blocks 127, which is connected to and movable along the guide rail 126, and is configured to move along the guide rail 126 using a motive power source such as an actuator under the control of the upper-level controller (not illustrated). In this sense, the transport module 250 forms a movable track unit.

The shifter unit 240 is adjacent to the transport modules 210A and 210B and causes the transport module 250 to move between a position A, which forms a track unit that continues to the transport module 210A, and a position A', which forms a track unit that continues to the transport module 210B. For example, when the transport module 250 is located at the position A of FIG. 4, the transport module 250 and the transport module 210A form a continuous track unit. Further, when the transport module 250 is located at the position A' of FIG. 4, the transport module 250 and the transport module 210B form a continuous track unit.

Note that, although FIG. 4 illustrates the shifter unit 240 configured such that the transport module 250 moves in parallel to the Y-axis direction, the configuration of the shifter unit 240 is not limited thereto. For example, a shifter unit having elevator structure in which the guide rail 126 is arranged along the Z-axis direction and the transport module 250 moves in the vertical direction may be employed. Alternatively, a shifter unit having turning structure that turns the transport module by using a rotational mechanism may be employed.

The carriage 220 is the same as the carriage 220 illustrated in the first embodiment. Although illustration is omitted in FIG. 1A to FIG. 3B, the carriage 220 further has a scale 119 provided on the top plate 111 in addition to the top plate 111, the magnet support 112, the permanent magnets 113, and the linear guide blocks 114, as illustrated in FIG. 4 to FIG. 5B, for example. Position information is recorded on the scale 119 along the moving direction of the carriage. Encoders 108 provided to the transport modules 210A, 210B, and 250 read the scale 119 of the carriage 220, and thereby it is possible to acquire position information on the carriage 220. A plurality of encoders 108 are attached to the transport modules 210A, 210B, and 250 at shorter intervals than the scale length of the scale 119, so that the scale 119 can be read by any one of the encoders 108. Note that, for better understanding of the relationship between the transport modules 210A and 250, FIG. 4 illustrates these transport modules with a part of the top plate 111 being cut out. The actual plane shape of the top plate 111 is a rectangular shape as illustrated in the dashed line in FIG. 4, for example.

The carriage 220 is configured so as to be movable on the transport modules 210A, 210B, and 250. This enables the carriage 220, which has moved on the transport module 210A, to move to the transport module 210B via the transport module 250 of the shifter unit 240, for example.

The transport module 250 of the shifter unit 240 includes shifter stands 110, the linear stands 102, the linear guide rails 103, and the acting-side cores 104 as illustrated in FIG. 4 to FIG. 5B. The length in the X-axis direction of the transport module 250 is a necessary and sufficient length with respect to the length in the X-axis direction of the carriage 220.

The excitation-side core 105, which is coupled to the acting-side cores 104 of the transport module 250 to form the core 232, and the coil 106 provided to the excitation-side core 105 are arranged on an extended line of each track unit of the transport modules 210A and 210B in a region in which the shifter unit 240 is arranged. That is, the excitation-side core 105 and the coil 106 of the shifter unit 240 are fixed to the shifter unit 240 independently of the transport module 250. Thereby, when the transport module 250 is located at the position A, the excitation-side core 105 on the extended line of the transport module 210A and the acting-side cores 104 of the transport module 250 are magnetically coupled to each other. In such a way, a stator of the linear motor that is continuous from the transport module 210A to the transport module 250 is formed. Further, when the transport module 250 is located at the position A', the excitation-side core 105 on the extended line of the transport module 210B and the acting-side cores 104 of the transport module 250 are magnetically coupled to each other. In such a way, a stator of the linear motor that is continuous from the transport module 250 to the transport module 210B is formed.

The encoder 108 of the shifter unit 240 is fixed to a portion other than the transport module 250 by a fixing scheme so as not to physically interfere when the transport module 250 moves in the Y-axis direction and is configured not to move in synchronization with the transport module 250. Further, a position detection device 109 used for detecting a position in the Y-axis direction of the transport module 250 is provided to the shifter unit 240.

As described above, in the transport module of the present embodiment, the excitation-side core 105 and the coil 106 of the shifter unit 240 are fixed to the apparatus independently of the transport module 250. Further, the encoder 108 and the position detection device 109 of the shifter unit 240 are fixed to a portion other than the transport module 250. Therefore, this enables a configuration that requires no cableveyor (registered trademark) for connection cables to the peripheral device and the driver of the shifter unit 240.

Therefore, in the transport apparatus of the present embodiment, no swinging of a connection cable due to motion of the movable track unit occurs, and it is possible to prevent occurrence of generation of dust or disconnection of a connection cable due to sliding or bending of the connection cable. Such a feature of the transport apparatus of the present embodiment is extremely useful in a manufacturing line of precision instruments in which it is important to suppress generation of dust, for example.

A shorter gap in a portion where the acting-side core 104 and the excitation-side core 105 face each other results in a smaller magnetic resistance Rba, which is a preferable form having a small reduction in efficiency of a motor. The magnetic resistance Rba is expressed by Equation (3) below, where the cross-sectional area of the facing surfaces of the acting-side core 104 and the excitation-side core 105 is denoted as S, the relative distance between the facing surfaces is denoted as L, and the relative magnetic permeability of air is denoted as μ.

$$ba = 1/\mu \times L/S \quad (3)$$

The gap (relative distance L) between the acting-side core 104 and the excitation-side core 105 is suitably adjusted so that the acting-side core 104 and the excitation-side core 105 are not in physical contact when the transport module 250 moves and may be set to 0.4 mm, for example. The magnetic resistance Rba in such a case is 0.001 A/wb.

The magnetic resistance Rba between the acting-side core 104 and the excitation-side core 105 is not particularly limited as long as it is a magnetic resistance by which a magnetic flux that can drive the carriage 220 on the transport module 250 can be supplied to the acting-side core 104. It is desirable to set the magnetic resistance Rba as appropriate in accordance with the weight or acceleration of the carriage 220, the sliding resistance, the cogging resistance, or the magnetic force or the number of poles of the permanent magnet 113 provided to the carriage 220, or the like.

Although FIG. 4 to FIG. 5B illustrate only the single carriage 220, a plurality of carriages 220 are arranged on the track and controlled in the actual transport apparatus.

As described above, the present embodiment includes the shifter unit 240, and it is possible to suppress heat generated by the coil 106 from being transferred to the acting-side cores 104 via the excitation-side core 105. Accordingly, it is possible to suppress influence of heat generated by the coil 106 without increasing the size of the core unit 230 and realize a transport apparatus that can achieve accurate positioning repeatability even with a compact apparatus as a whole.

Further, according to the present embodiment, the peripheral device of the shifter unit 240 can be formed of a configuration that requires no cableveyor (registered trademark), and a circulation type linear transport apparatus without generation of dust from a cableveyor (registered trademark) can be realized.

Further, with a use of the configuration of the present embodiment, the acting-side cores 104 and the excitation-side cores 105 can be separated and arranged in different rooms. For example, with a configuration in which the acting-side cores 104 are arranged inside a vacuum chamber and the excitation-side cores 105 are arranged outside the vacuum chamber, it is possible to prevent an emission gas from the coils 106 from being introduced in the vacuum chamber.

Fifth Embodiment

Figure 6A:
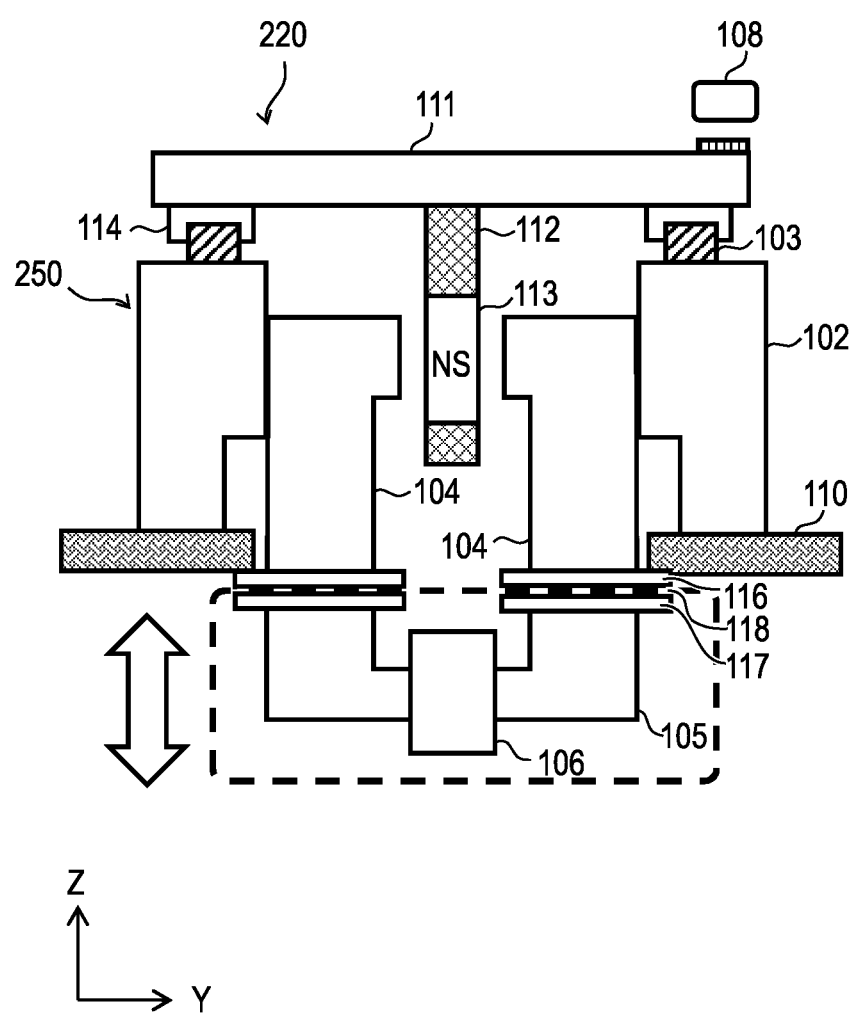
FIG. 6A is a sectional view illustrating a general configuration of a transport apparatus according to a fifth embodiment of the present invention.
Figure 6B:
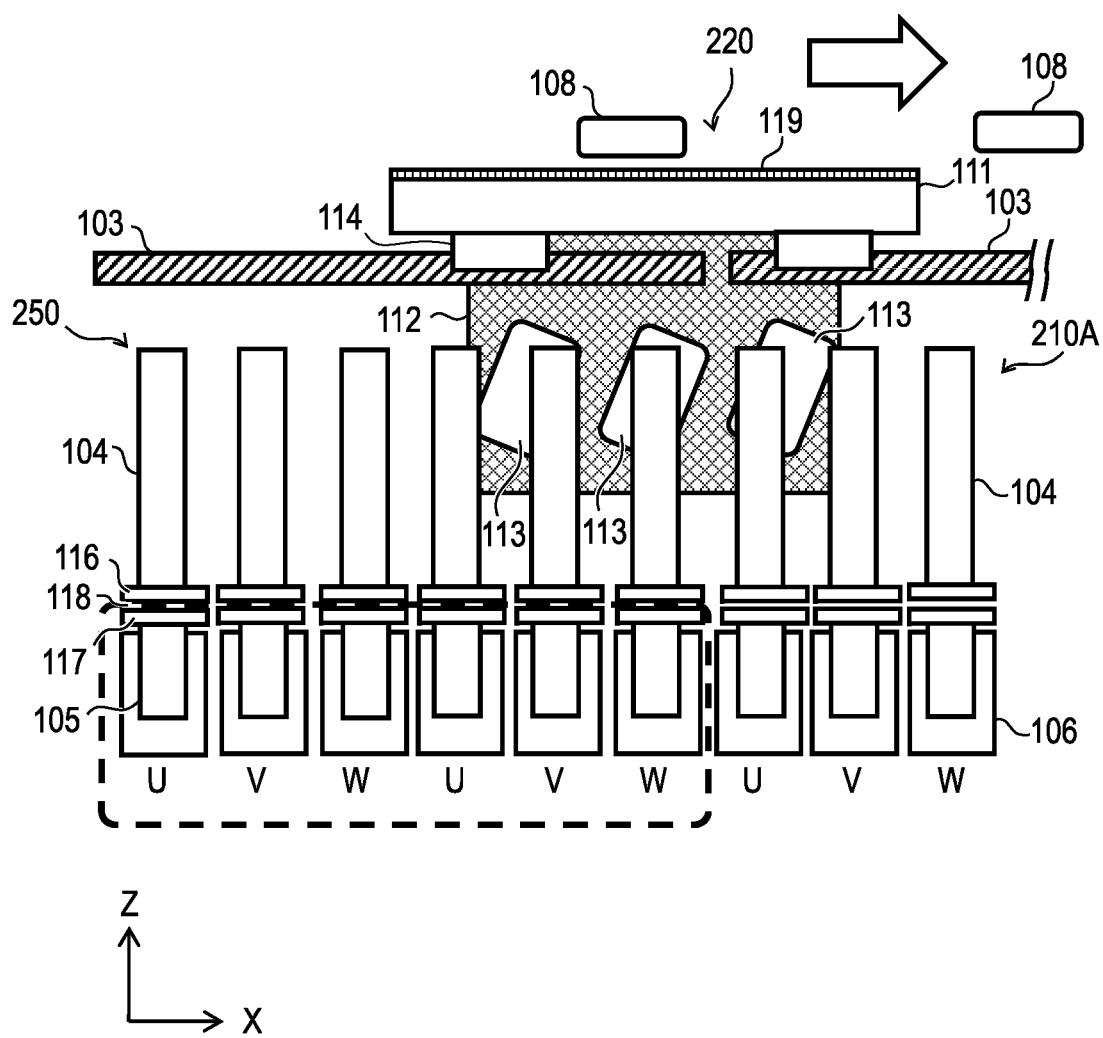
FIG. 6B is a sectional view illustrating a general configuration of the transport apparatus according to the fifth embodiment of the present invention.

The transport apparatus according to a fifth embodiment of the present invention will be described with reference to FIG. 6A and FIG. 6B. The same components as those in the transport apparatus according to the first to fourth embodiments are labeled with the same references, and the description thereof will be omitted or simplified. FIG. 6A and FIG. 6B are sectional views illustrating a general configuration of the transport apparatus according to the present embodiment. FIG. 6A corresponds to a sectional view in a plane parallel to the Y-Z plane including the line B-B' of the FIG. 4. Further, FIG. 6B corresponds to a sectional view in a plane parallel to the X-Z plane including the line C-C' of the FIG. 4.

In the configuration described in the fourth embodiment, the relative distance L between the facing surfaces of the acting-side core 104 and the excitation-side core 105 is set such that the acting-side core 104 and the excitation-side core 105 are not in physical contact with each other when the transport module 250 moves. However, the efficiency as a linear motor is more preferable when the relative distance L between the acting-side core 104 and the excitation-side core 105, that is, the magnetic resistance Rba is smaller, and a state where the relative distance L is 0 mm is ideal.

In terms of the above, in the transport apparatus according to the present embodiment, the shifter unit 240 further has a movable mechanism that causes the excitation-side core 105 and the coil 106 (the portion surrounded by a dashed line in FIG. 6A and FIG. 6B) to move vertically, in addition to the configuration of the fourth embodiment. This movable mechanism has a mechanism that lifts and lowers the excitation-side core 105 and the coil 106 such that the relative distance L between the excitation-side core 105 and the acting-side core 104 can be freely changed when the transport module 250 is located at a predetermined position where the carriage 220 is ready to move to the stationary track unit. The elevating control of the excitation-side core 105 and the coil 106 can be performed by the upper-level controller (not illustrated) by using an electric actuator (not illustrated), for example.

In response to detecting from the position detection device 109 that the transport module 250 is located at the position A of FIG. 4, the upper-level controller drives the movable mechanism at any timing before starting motion of the carriage 220 from the transport module 210A to the transport module 250. The movable mechanism lifts the excitation-side core 105 and the coil 106 arranged at the position A by using the electric actuator and reduces the relative distance between the facing surfaces of the acting-side core 104 and the excitation-side core 105. For example, the movable mechanism causes the facing surfaces of the acting-side core 104 and the excitation-side core 105 to come into contact with each other and thereby sets the relative distance L to 0 mm.

Next, in response to the encoder 108 detecting that the motion of the carriage 220 to the transport module 250 is completed, the movable mechanism lowers the excitation-side core 105 and causes the transport module 250 to be ready to move under the control of the upper-level controller.

In response to detecting from the position detection device 109 that the transport module 250 has moved to the position A' of FIG. 4, the upper-level controller drives the movable mechanism. The movable mechanism lifts the excitation-side core 105 and the coil 106 arranged at the position A by using the electric actuator. Thereby, the driver unit (not illustrated) is ready to drive the carriage 220 located on the transport module 250.

The elevation distance of the excitation-side core 105 may be any distance as long as a gap by which the acting-side core 104 and the excitation-side core 105 are not in physical contact with each other can be maintained when the transport module 250 is moving and, specifically, order of around several millimeters is sufficient. Therefore, no cableveyor (registered trademark) for connection cables to the excitation-side core 105 and the driver (not illustrated) is required.

Note that, although the movable mechanism is driven so that the acting-side core 104 and the excitation-side core 105 come into contact with each other in the present embodiment, it is not necessarily required to cause the acting-side core 104 and the excitation-side core 105 to come into contact with each other. When the relative distance L between the acting-side core 104 and the excitation-side core 105 is set to some distance larger than 0 mm, heat conduction between the acting-side core 104 and the excitation-side core 105 can be effectively reduced as described in the third embodiment. Even when the acting-side cores 104 and the excitation-side core 105 are contacted to each other, since these cores are not integrally formed, the advantageous effect of preventing heat conduction can be expected to some degrees.

As described above, according to the present embodiment, a configuration that requires no cableveyor (registered trademark) for connection cables to the coil 106 and the driver of the movable track unit can be provided, and a circulation type linear transport apparatus without generation of dust from a cableveyor (registered trademark) can be realized.

Sixth Embodiment

Figure 8A:
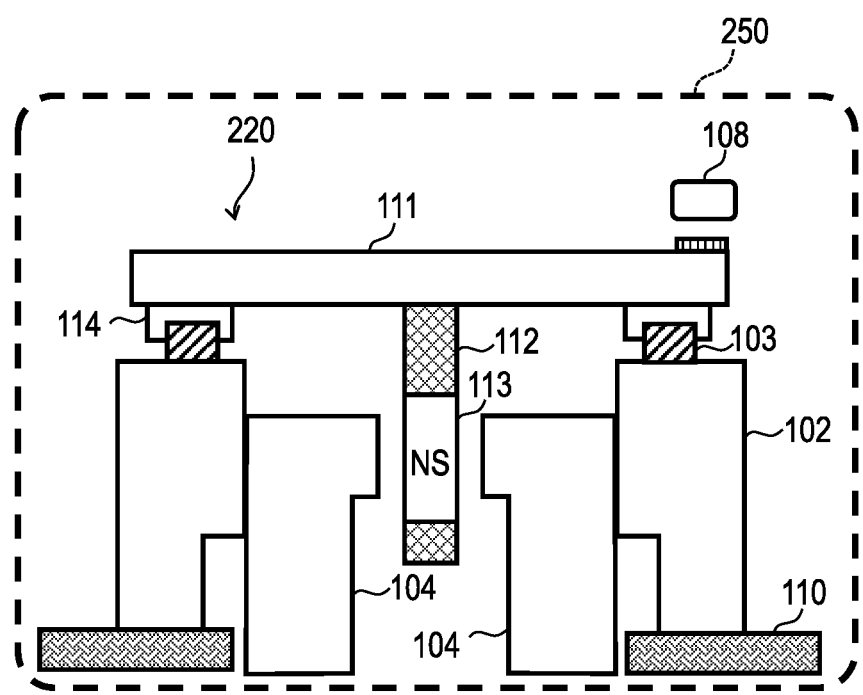
FIG. 8A is a sectional view illustrating a general configuration of a transport apparatus according to the sixth embodiment of the present invention.
Figure 8B:
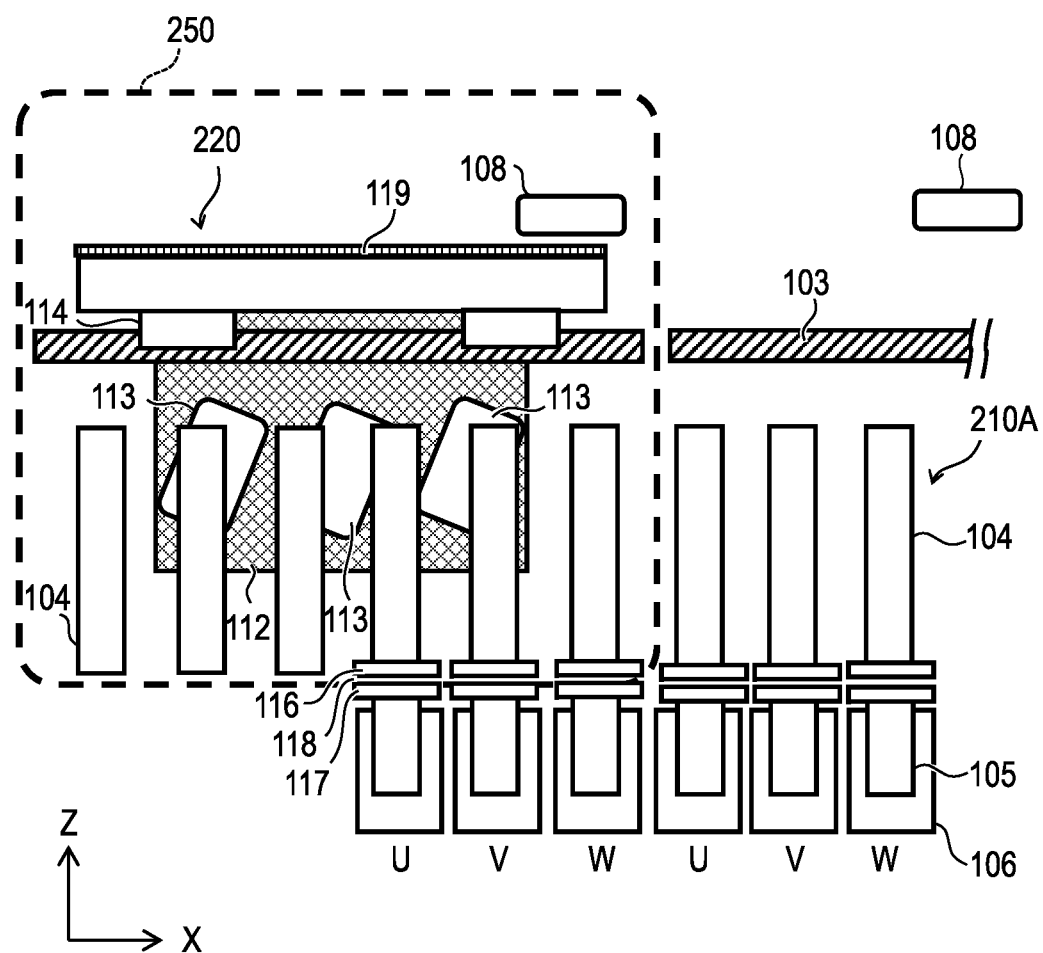
FIG. 8B is a sectional view illustrating a general configuration of the transport apparatus according to the sixth embodiment of the present invention.

The transport apparatus according to a sixth embodiment of the present invention will be described with reference to FIG. 7 to FIG. 8B. The same components as those in the transport apparatus according to the first to fifth embodiments are labeled with the same references, and the description thereof will be omitted or simplified. FIG. 7 is a top view illustrating a general configuration of the transport apparatus according to the present embodiment. FIG. 8A and FIG. 8B are sectional views illustrating a general configuration of the transport apparatus according to the present embodiment. FIG. 8A is a sectional view in a plane parallel to the Y-Z plane including a line B-B' of the FIG. 7. Further, FIG. 8B is a sectional view in a plane parallel to the X-Z plane including a line C-C' of the FIG. 7.

The length of the linear guide rail 103 provided to the transport module 250 of the shifter unit 240 is determined so as to be a necessary and sufficient length for the length in the X-axis direction of the carriage 220 as described above. In the fourth embodiment, as illustrated in FIG. 4, the same number of sets of the excitation-side cores 105 and the coils 106 as the number of pairs of the acting-side cores 104 provided to correspond to the length of the linear guide rail 103 of the transport module 250 are arranged to the shifter unit 240.

Herein, in the transport module 250 in the transport apparatus of the fourth embodiment, both the end on a side that the carriage 220 enters from the transport module 210A and the end on a side that the carriage 220 exits to the transport module 210B are on the right side in the drawings. Therefore, on the left side of the transport module 250 that is opposite to the right side that the carriage 220 enters and exits, the acting-side cores 104, the excitation-side cores 105, and the coils 106 used for driving the carriage 220 are not necessarily required.

Accordingly, in the transport apparatus of the present embodiment, only the minimal number of excitation-side cores 105 and coils 106 required for driving to perform entry and exit of the carriage 220 are arranged in the shifter unit 240 to achieve a reduction of cost. The acting-side cores 104 are arranged such that the number of acting-side cores 104 corresponds to the length of the linear guide rail 103 of the transport module 250 so that cogging of the movable element is not increased.

As described above, according to the present embodiment, a configuration that requires no cableveyor (registered trademark) for connection cables to the coil 106 and the driver of the movable track unit can be provided, and a circulation type linear transport apparatus without generation of dust from a cableveyor (registered trademark) can be realized. Further, the number of excitation-side cores 105 and coils 106 can be reduced to achieve a reduction of cost.

Seventh Embodiment

Figure 9:
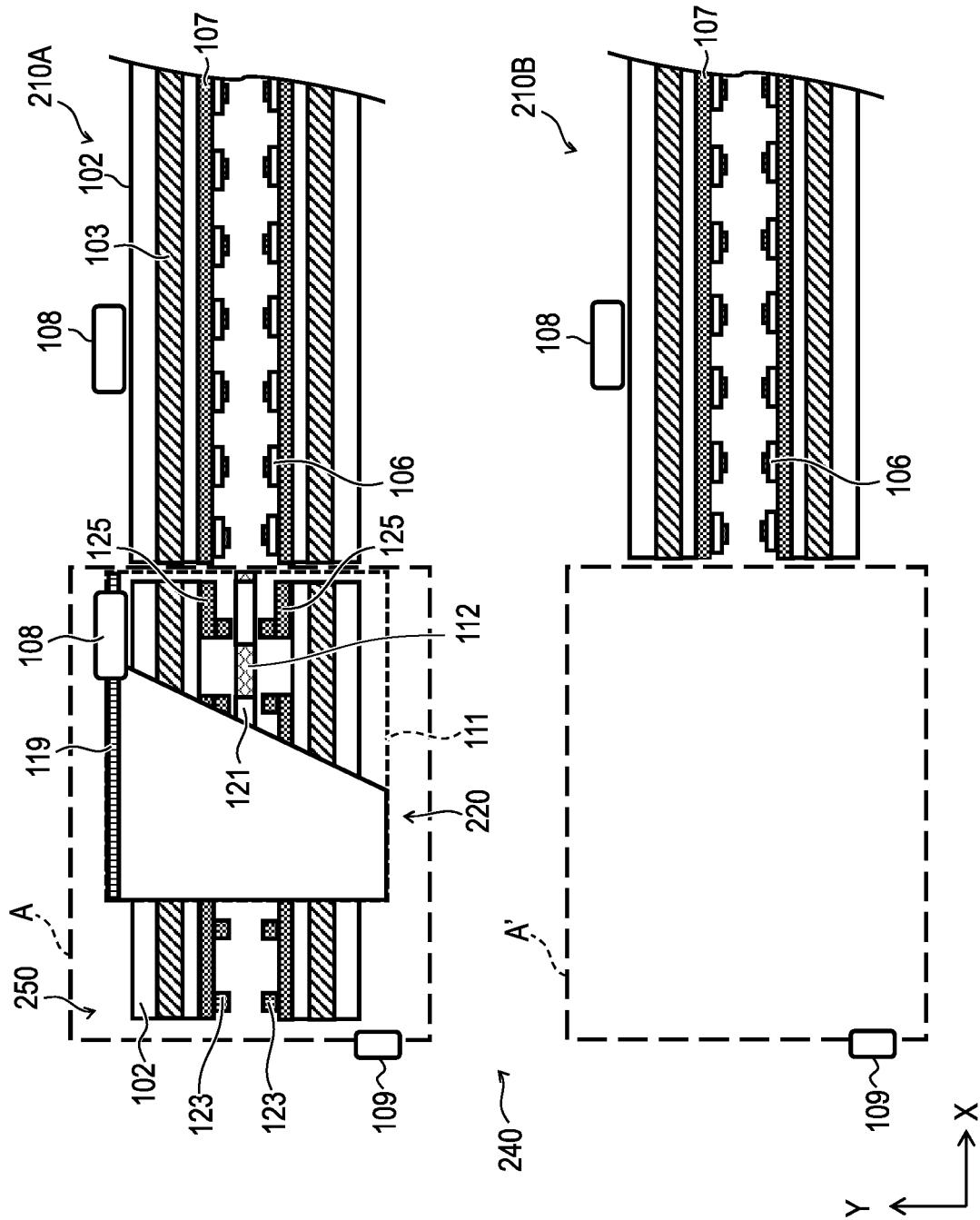
FIG. 9 is a top view illustrating a general configuration of a transport apparatus according to a seventh embodiment of the present invention.

The transport apparatus according to a seventh embodiment of the present invention will be described with reference to FIG. 9 and FIG. 10. The same components as those in the transport apparatus according to the first to sixth embodiments are labeled with the same references, and the description thereof will be omitted or simplified. FIG. 9 is a top view illustrating a general configuration of the transport apparatus according to the present embodiment. FIG. 10 is a schematic diagram illustrating the structure of cores of the transport module in the transport apparatus according to the present embodiment.

As described in the sixth embodiment, in the transport apparatus of the fourth embodiment, the acting-side core 104, the excitation-side core 105, and the coil 106 used for driving the carriage 220 are not necessarily required on the left side of the transport module 250 that is opposite to the right side that the carriage 220 enters and exits. Further, with a configuration in which the cores of the stator of the transport module 250 are magnetically coupled to the cores of the stator of the transport module 210A or 210B, the coil 106 is not necessarily required to be arranged on the right side of the transport module 250 that the carriage 220 enters and exits.

In the present embodiment, a transport apparatus having a simpler configuration in terms of the above will be described. With application of the present embodiment, it is possible to realize the same advantageous effects as those in the fourth embodiment and achieve a further reduction of cost.

As illustrated in FIG. 9, the transport modules 210A and 210B forming the stationary track units have cores 107. The core 107 has a shape in which cores of a plurality of coils 106 forming the U-phase, the V-phase, and the W-phase are integrally formed. Specifically, for example, 12 coils 106 aligned in the moving direction (X-axis direction) of the movable element are provided to a single core 107, a plurality of these cores 107 are aligned, and thereby the stator of the linear motor is formed.

The transport module 250 forming the movable track unit has acting-side cores 125 and cores 123. The coil 106 is not provided to the acting-side core 125, the acting-side core 125 and the core 107 are magnetically coupled to each other, and thereby the coil 106 of the transport module 210A or the transport module 210B also serves as the coil of the transport module 250.

FIG. 10 illustrates in more detail a portion in which the acting-side core 125 of the transport module 250 and the core 107 of the transport module 210A are coupled to each other. The gap between the facing surfaces of the core 107 and the acting-side core 125 is set to a distance by which the transport module 250 forming the movable track unit and the transport module 210A forming the stationary track unit do not physically interfere with each other. It is desirable that this gap be narrow as much as possible in terms of reducing the magnetic resistance between the core 107 and the acting-side core 125. For example, the cross-sectional area of the facing surfaces of the core 107 and the acting-side core 125 can be set to 400 mm2 per core on one side, and the gap described above can be set to 0.2 mm Note that, although permanent magnets 120, 121, and 122 are of the three-pole configuration in FIG. 10, the configuration is not limited thereto.

When the acting-side core 125 of the transport module 250 and the core 107 of the transport module 210A are in the positional relationship as illustrated in FIG. 10, the acting-side core 125 and the core 107 are magnetically coupled to each other. Further, the acting-side core 125 is subjected to a magnetic flux excited by the coil 106 provided to the core 107 of the transport module 210A and forms a magnetic circuit illustrated by arrows in FIG. 10. The carriage 220 located on the transport module 250 is subjected to a magnetic flux excited by the coil 106 via the core 107 and the acting-side core 125 and thereby is ready to move in the X-axis direction.

The core 123 of the transport module 250 is provided for reducing cogging of the movable element. That is, the core 123 functions as a cogging reduction core. The core 123 is arranged such that a magnetic flux excited by the coil 106 is transferred to the permanent magnet 120 via the acting-side core 125. Specifically, the core 123 is arranged such that magnetic resistances Rcc and Rcm satisfy the relationship of Rcc>Rcm, where the magnetic resistance occurring due to the distance between the acting-side core 125 and the core 123 is denoted as Rcc, and the magnetic resistance occurring due to the distance between the acting-side core 125 and the permanent magnet 120 is denoted as Rcm. When these magnetic resistances satisfy the relationship of Rcc>Rcm, a magnetic circuit formed via the permanent magnet 120 by the magnetic flux occurring due to the coil 106 is dominant, and the carriage 220 located on the transport module 250 can be driven.

In the configuration in which the acting-side core 125 of the transport module 250 is separated from the core 107, the advantageous effect of reducing transfer of heat generated by the coil 106 to the acting-side core 125 can also be expected in the same manner as described in the above embodiments.

As described above, according to the present embodiment, a configuration that requires no connection cable to the coil and the driver for the movable track unit can be provided, and a circulation type linear transport apparatus without generation of dust can be realized by using a configuration that requires no cableveyor (registered trademark). Further, the number of excitation-side cores 105 and coils 106 can be reduced to achieve a reduction of cost.

Eighth Embodiment

The transport apparatus according to an eighth embodiment of the present invention will be described with reference to FIG. 11A to FIG. 11C. The same components as those in the transport apparatus according to the first to seventh embodiments are labeled with the same references, and the description thereof will be omitted or simplified. FIG. 11A to FIG. 11C are schematic diagrams illustrating the structure and operation of cores of a transport module in the transport apparatus according to the present embodiment.

The transport apparatus according to the present embodiment is the same as the transport apparatus of the seventh embodiment except for further having cores 124 at the end of on the transport module 250 side of the transport modules 210A and 210B forming the stationary track unit, as illustrated in FIG. 11A. The core 124 is configured to be movable in the moving direction of the movable element, and the gap between the core 124 and the core 107 and the gap between the core 124 and the acting-side core 125 can be freely adjusted. The core 124 is configured to be able to be magnetically coupled to the core 107 and the acting-side core 125.

When the movable element is driven by the magnetic circuit formed of the acting-side core 125 and the core 124, the core 124 is arranged at a position where the magnetic resistance between the core 107 and the core 124 is larger than the magnetic resistance between the acting-side core 125 and the core 124 (FIG. 11B). On the other hand, when the movable element is driven by the magnetic circuit formed of the core 107 and the core 124, the core 124 is arranged at a position where the magnetic resistance between the acting-side core 125 and the core 124 is larger than the magnetic resistance between the core 107 and the core 124 (FIG. 11C). Note that a smaller magnetic resistance in a gap on the driving side of the movable element is preferable. In terms of the above, a state where the cores of interest are in contact with each other is desirable.

The mechanism for moving the core 124 can be implemented by using an electric actuator (not illustrated) and controlling the electric actuator from the upper-level controller (not illustrated).

Although the core 123 described in the seventh embodiment is not illustrated in FIG. 11A to FIG. 11C, the transport module 250 may further have the core 123. When the transport module 250 has the core 123, the core 123 is arranged such that a magnetic flux excited by the coil 106 is transferred to the permanent magnet 120 via the acting-side core 125. Specifically, the core 123 is arranged such that magnetic resistances Rcc and Rcm satisfy the relationship of Rcc>Rcm, where the magnetic resistance occurring due to the distance between the acting-side core 125 and the core 123 is denoted as Rcc, and the magnetic resistance occurring due to the distance between the acting-side core 125 and the permanent magnet 120 is denoted as Rcm.

As described above, according to the present embodiment, a configuration that requires no connection cable to the coil and the driver for the movable track unit can be provided, and a circulation type linear transport apparatus without generation of dust from a cableveyor (registered trademark) can be realized. Further, the number of excitation-side cores 105 and coils 106 can be reduced to achieve a reduction of cost.

Ninth Embodiment

The transport apparatus according to a ninth embodiment of the present invention will be described with reference to FIG. 12A and FIG. 12B. The same components as those in the transport apparatus according to the first to eighth embodiments are labeled with the same references, and the description thereof will be omitted or simplified.

Figure 12A:
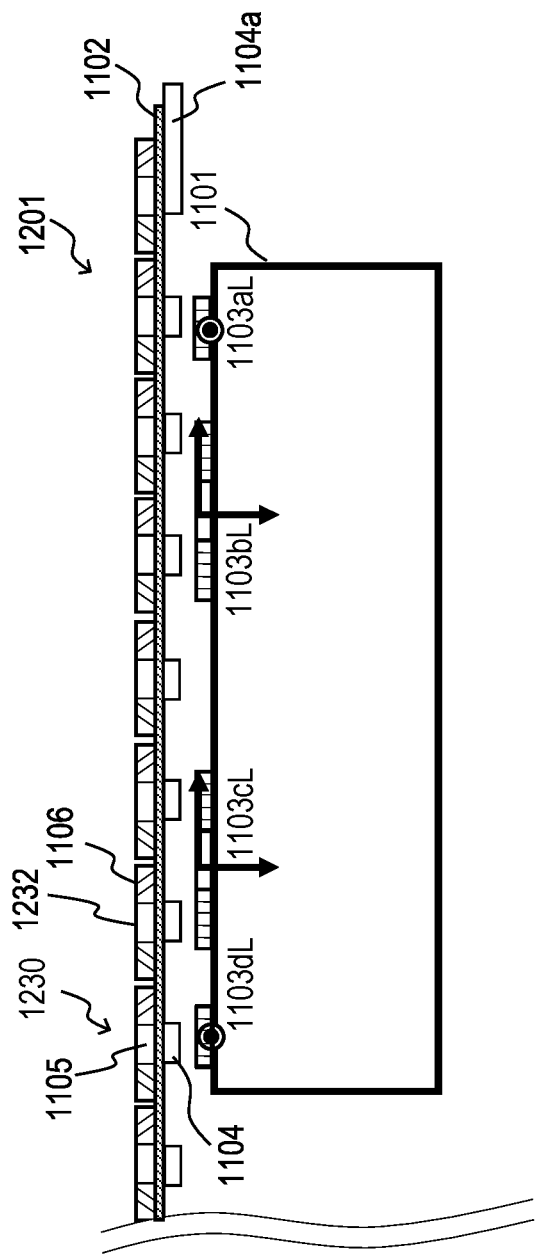
FIG. 12A is a sectional view illustrating a general configuration of a transport apparatus according to a ninth embodiment of the present invention.
Figure 12B:
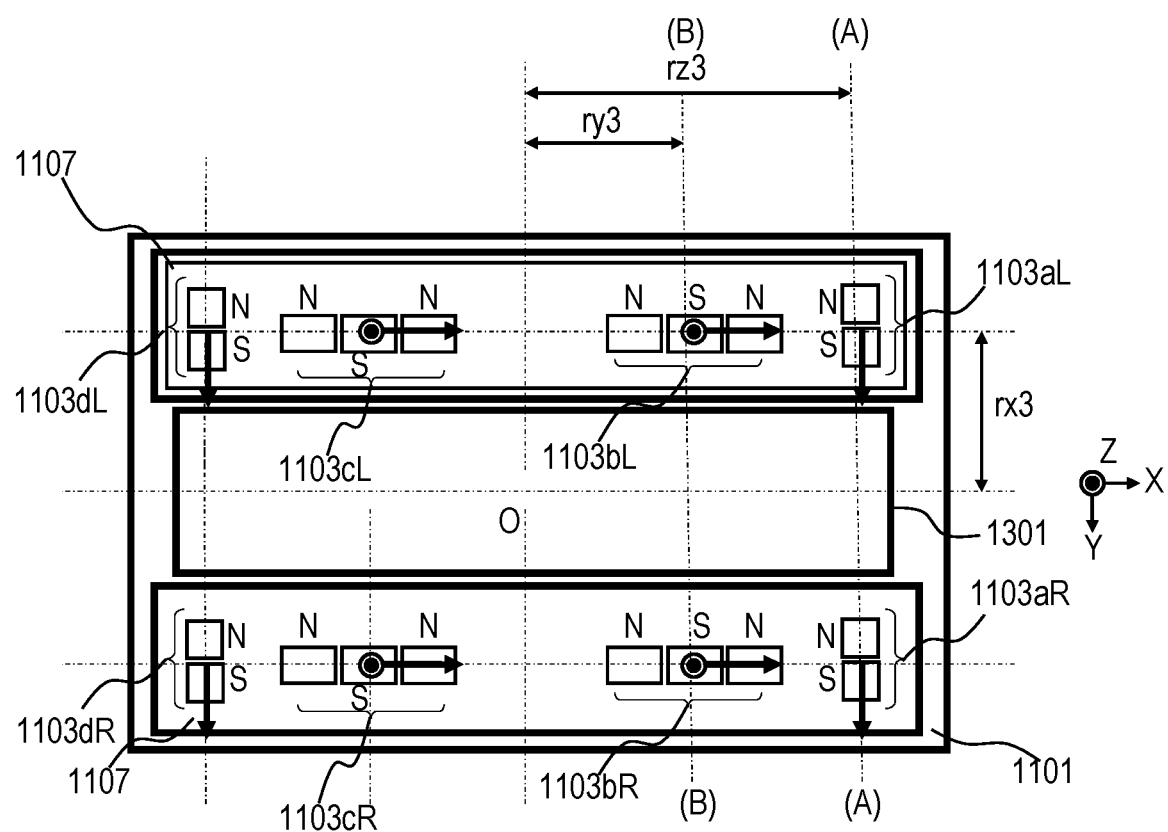
FIG. 12B is a top view illustrating a general configuration of the transport apparatus according to the ninth embodiment of the present invention.

FIG. 12A and FIG. 12B are schematic diagrams illustrating the overall configuration of the transport apparatus including a movable element 1101 and a stator 1201 according to the present embodiment. Note that FIG. 12A and FIG. 12B each illustrate an extracted primary portion of the movable element 1101 and the stator 1201. Further, FIG. 12A is a diagram of the movable element 1101 when viewed from the Y direction described later, and FIG. 12B is a diagram of the movable element 1101 when viewed from the Z direction described later.

As illustrated in FIG. 12A and FIG. 12B, the transport apparatus according to the present embodiment has the movable element 1101 forming a carriage or a slider and the stator 1201 forming a transport path. The transport apparatus is provided with a movable magnet type linear motor (a moving permanent magnet type linear motor, a movable field system type linear motor). Furthermore, the transport apparatus in the present embodiment does not have any guide device such as a linear guide and is configured as a magnetic floating type transport apparatus that transports the movable element 1101 in a contactless manner on the stator 1201.

The transport apparatus transports a workpiece 1301 provided on the movable element 1101 to a process apparatus that performs a processing operation on the workpiece 1301 by transporting the movable element 1101 by using the stator 1201, for example. Although the form in which the workpiece 1301 is mounted on the movable element 1101 is illustrated in the present embodiment, a form is not limited thereto, and a form in which the workpiece 1301 is held on the under surface of the movable element 1101 and transported may be employed, for example. Further, a form in which the workpiece 1301 is held on the side face of the movable element 1101 and transported may be employed. By performing a processing operation on the workpiece 1301, it is possible to manufacture a precision article. Note that, although one movable element 1101 is illustrated for the stator 1201 in FIG. 12A and FIG. 12B, the number thereof is not limited thereto. In the transport apparatus, a plurality of movable elements 1101 may be transported on the stator 1201.

Herein, coordinate axes, directions, and the like used in the following description are defined. First, the X-axis is defined in the horizontal direction that is a transport direction of the movable element 1101, and the transport direction of the movable element 1101 is defined as the X direction. Further, the Z-axis is defined in the perpendicular direction that is a direction orthogonal to the X direction, and the perpendicular direction is defined as the Z direction. Further, the Y-axis is defined in a direction orthogonal to the X-direction and the Z-direction, and the direction orthogonal to the X direction and the Z direction is defined as the Y direction. Furthermore, rotation around the X-axis is denoted as Wx, and rotation around the Y-axis and rotation around the Z-axis are denoted as Wy and Wz, respectively. Further, "*" is used as a symbol of multiplication. Further, the center of the movable element 1101 is defined as the origin O, on the positive (+) side of Y is denoted as R-side, and on the negative (−) side of Y is denoted as L-side. Note that, while the transport direction of the movable element 1101 is not necessarily required to be the horizontal direction, the transport direction is defined as the X direction also in such a case, and the Y direction and the Z direction may be defined in the same manner.

Figure 13:
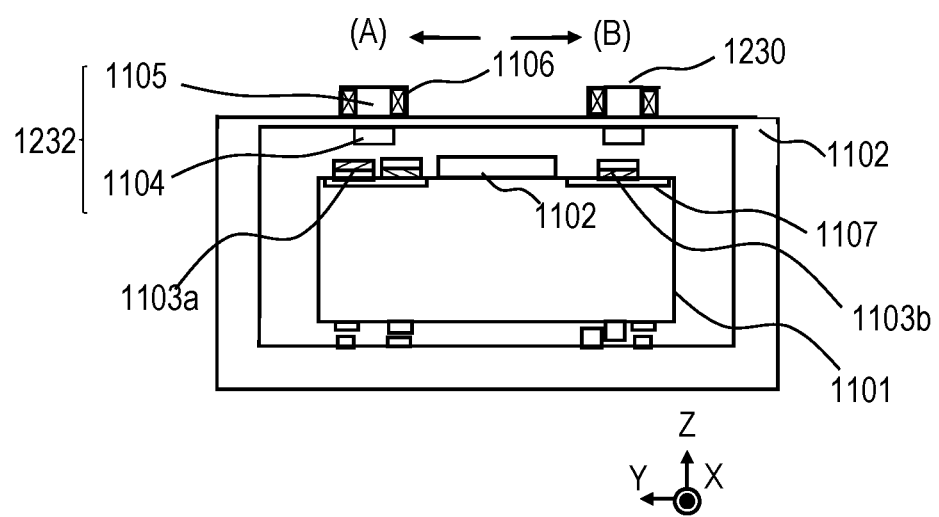
FIG. 13 is a sectional view illustrating a general configuration of the transport apparatus according to the ninth embodiment of the present invention.

Next, the movable element 1101 that is a transport target in the transport apparatus according to the present embodiment will be described with reference to FIG. 12A, FIG. 12B, and FIG. 13. FIG. 13 is a schematic diagram illustrating the movable element 1101 and the stator 1201 in the transport apparatus according to the present embodiment. Note that FIG. 13 is a diagram of the movable element 1101 and the stator 1201 when viewed from the X direction. Further, the left part of FIG. 13 illustrates a cross section (A) taken along a line (A)-(A) of FIG. 12B. Further, the right part of FIG. 13 illustrates a cross section (B) taken along a line (B)-(B) of FIG. 12B.

As illustrated in FIG. 12A, FIG. 12B, and FIG. 13, the movable element 1101 has permanent magnets 1103$a$R, 1103$b$R, 1103$c$R, 1103$d$R, 1103$a$L, 1103$b$L, 1103$c$L, and 1103$d$L as permanent magnets 1103.

The permanent magnets 1103 are aligned in two lines along the L-side end and the R-side end on the upper surface parallel to the X direction of the movable element 1101 and are attached thereto. Specifically, the permanent magnets 1103$a$R, 1103$b$R, 1103$c$R, and 1103$d$R are attached on the R-side on the upper surface of the movable element 1101. Further, the permanent magnets 1103$a$L, 1103$b$L, 1103$c$L, and 1103$d$L are attached on the L-side on the upper surface of the movable element 1101. Note that, in the following, the permanent magnet of the movable element 1101 is simply denoted to as "permanent magnet 1103" unless specific distinction thereof is required. Further, when the R-side and the L-side are not required to be distinguished but each permanent magnet 1103 is required to be specified individually, each permanent magnet 1103 is specified individually by using a reference from which R or L has been removed from the end of the reference for each permanent magnet 1103 and which therefore ends a small letter alphabet as an identifier. In such a case, each permanent magnet 1103 is individually specified by denoting "permanent magnet 1103a", "permanent magnet 1103b", "permanent magnet 1103c", or "permanent magnet 1103d".

The permanent magnets 1103aR and 1103dR are attached to one end and the other end in the X direction on the R-side of the upper surface parallel to the X direction of the movable element 1101. The permanent magnets 1103bR and 1103cR are attached between the permanent magnets 1103aR and 1103dR on the R-side on the upper surface of the movable element 1101. The permanent magnets 1103aR, 1103bR, 1103cR, and 1103dR are arranged at an equal pitch in the X direction, for example. Further, the permanent magnets 1103aR, 1103bR, 1103cR, and 1103dR are arranged such that the centers of respective permanent magnets are aligned on a straight line parallel to the X direction at a predetermined distance rx3 away from the center of the upper surface of the movable element 1101 to the R-side, for example.

The permanent magnets 1103aL and 1103dL are attached to one end and the other end in the X direction on the L-side of the upper surface parallel to the X direction of the movable element 1101. The permanent magnets 1103bL and 1103cL are attached between the permanent magnets 1103aL and 1103dL on the L-side on the upper surface of the movable element 1101. The permanent magnets 1103aL, 1103bL, 1103cL, and 1103dL are arranged at an equal pitch in the X direction, for example. Further, the permanent magnets 1103aL, 1103bL, 1103cL, and 1103dL are arranged such that the centers of respective permanent magnets are aligned on a straight line parallel to the X direction at a predetermined distance rx3 away from the center of the upper surface of the movable element 1101 to the L-side, for example. Furthermore, the permanent magnets 1103aL, 1103bL, 1103cL, and 1103dL are arranged at the same positions as the permanent magnets 1103aR, 1103bR, 1103cR, and 1103dR, respectively, in the X direction.

The permanent magnets 1103a and 1103d are attached at positions at a distance rz3 away from the origin O, which is the center of the movable element 1101, to one side and the other side in the X direction, respectively. The permanent magnets 1103a, 1103b, 1103c, and 1103d are attached at positions at the distance rx3 in the Y direction away from the origin O, respectively. The permanent magnets 1103c and 1103b are attached at positions at a distance ry3 away from the origin O to one side and the other side in the X direction, respectively.

Each of the permanent magnets 1103aR, 1103dR, 1103aL, and 1103dL is a set of two permanent magnets arranged parallel to the Y direction. Each of the permanent magnets 1103a and 1103d is configured such that two permanent magnets are aligned parallel to the Y direction such that the polarities of the outer magnetic poles facing the stator 1201 side are different alternately. Note that the number of permanent magnets arranged parallel to the Y direction forming the permanent magnets 1103a and 1103d is not limited to two and may be any number as long as it is plural. Further, the direction in which the permanent magnets forming the permanent magnets 1103a and 1103d are arranged is not necessarily required to be the Y direction orthogonal to the X direction, which is the transport direction, and may be any direction that crosses the X direction. That is, the permanent magnets 1103a and 1103d may be any magnet group made of a plurality of permanent magnets arranged parallel to a direction crossing the X direction such that the polarities of respective magnetic poles alternate.

On the other hand, each of the permanent magnets 1103bR, 1103cR, 1103bL, and 1103cL is a set of three permanent magnets arranged parallel to the X direction. Each of the permanent magnets 1103b and 1103c is configured such that three permanent magnets are aligned parallel to the X direction such that the polarities of the outer magnetic poles facing the stator 1201 side are different alternately. Note that the number of permanent magnets arranged parallel to the X direction forming the permanent magnets 1103b and 1103c is not limited to three and may be any number as long as it is plural. That is, the permanent magnets 1103b and 1103c may be any magnet group made of a plurality of permanent magnets arranged parallel to the X direction such that the polarities of respective magnetic poles alternate.

Each permanent magnet 1103 is attached to each of yokes 1107 provided on the R-side and the L-side on the upper surface of the movable element 1101. The yoke 1107 is formed of a substance having a large magnetic permeability, for example, iron.

In such a way, the center axis parallel to the X-axis of the movable element 1101 is defined as a symmetry axis, and the plurality of permanent magnets 1103 are arranged to the movable element 1101 symmetrically on the R-side and the L-side on the upper surface. The movable element 1101 on which the permanent magnets 1103 are arranged is configured to be movable while the attitude thereof is controlled in six axes by electromagnetic force applied to the permanent magnet 1103 from a plurality of coils 1106 of the stator 1201 as described later.

The movable element 1101 is movable in the X direction along the plurality of coils 1106 arranged in two lines parallel to the X direction. The movable element 1101 is transported in a state where the workpiece 1301 to be transported is placed or mounted on the upper surface or the under surface thereof. The movable element 1101 may have a holding mechanism that holds the workpiece 1301 on the movable element 1101, such as a workpiece holder, for example.

Next, the stator 1201 in the transport apparatus according to the present embodiment will be described with reference to FIG. 12A and FIG. 13.

A plurality of core units 1230 are aligned at a predetermined interval along the moving direction (X-axis direction) of the movable element 1101 and form a stator of the linear motor. Each of the plurality of core units 1230 has a core 1232 and a coil 1106. The core 1232 has excitation-side cores 1105, acting-side cores 1104, and thermal insulation portions 1102 each provided between the acting-side core 1104 and the excitation-side core 1105. That is, the thermal insulation portion is provided in the middle of a magnetic path. Note that, although FIG. 12A illustrates the transport apparatus having nine core units 1230 aligned in the X-axis direction for simplified illustration of the drawing, the transport apparatus has a necessary number of core units 1230 for forming a linear motor of any length in the actual implementation. The present embodiment illustrates an example in which the thermal insulation portion 1102 is a partition wall that partitions stations forming a production apparatus, such as a partition wall of a vacuum (decompression) chamber or a partition wall of a chamber used for separating a gas, which is different from air, from the air or the like. However, without being limited to the above, the thermal insulation portion 1102 may be a coil box covering a plurality of core units, for example.

The acting-side core 1104 is connected and fixed to the thermal insulation portion 1102 (the partition wall of a chamber in the present embodiment) in the present embodiment. Without being limited to the above, however, the acting-side core 1104 may be connected and fixed to a coil box covering a plurality of core units, or the coil box partially having high magnetic permeability, for example. The excitation-side core 1105 is connected to the acting-side core 1104 via the thermal insulation portion 1102 (the partition wall of a chamber in the present embodiment). The material of the acting-side core 1104 and the excitation-side core 1105 is not particularly limited, and a magnetic material such as stacked silicon steel plates may be applied thereto, for example.

Each coil 1106 is wound around the excitation-side core 1105 of the core 1232 and has a role of exciting the core 1232. The acting-side cores 1104 are arranged so as to be magnetically coupled to the excitation-side core 1105, are subjected to a magnetic flux generated by the excitation-side core 1105, and cause this magnetic flux to work on the movable element 1101 arranged in the core gap G. The thermal insulation portion 1102 functions as a heat conduction reduction portion that reduces heat conduction from the excitation-side core 1105 to the acting-side core 1104 more than in a case where the excitation-side core 1105 and the acting-side core 1104 are in direct contact with each other.

Further, for example, a structure such as a gate valve may be present between the core units 1230. In such a place, the core units 1230 may be unable to be arranged continuously. In such a place, when the movable element passes through the boundary thereof, a discontinuous point may occur in driving power corresponding to floating, position control, or driving force obtained from a drive system on the stator side, and there is a risk of problems of deviation of the movable element from a target track, occurrence of displacement, or reduction in position accuracy. In such a place, it is preferable to employ arrangement in which the length of the acting-side core in a direction toward a place where a core unit is unable to be arranged is longer than the typical length of the acting-side core as with the acting-side core 1104a of FIG. 12A. Since this can increase attractive force, reduction in position accuracy can be suppressed.

Modified Embodiments

The present invention is not limited to the embodiments described above, and various modifications are possible. For example, an example in which a part of the configuration of any of the embodiments is added to another embodiment or an example in which a part of the configuration of any of the embodiments is replaced with a part of the configuration of another embodiment is also one of the embodiments of the present invention.

Note that all the embodiments described above merely illustrate embodied examples in implementing the present invention, and the technical scope of the present invention is not to be construed in a limiting sense by these embodiments. That is, the present invention can be implemented in various forms without departing from the technical concept or the primary feature thereof. To publicize the scope of the present invention, the following claims are appended.

According to the present invention, it is possible to realize a compact linear motor and a compact transport apparatus that suppress influence due to heat generated from coils and have accurate positioning performance, accurate positioning repeatability, and accurate transport performance. Further, it is possible to suppress generation of dust or disconnection of a cable due to sliding or the like of a connection cable and realize a transport apparatus suitable for application to a manufacturing line for precision instruments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A production apparatus comprising:
   a stator including a core and a plurality of coils that are arranged along a first direction, at least one of the plurality of coils being configured to excite the core;
   a movable element including a permanent magnet and configured to be movable along the first direction; and
   a chamber,
   wherein the core includes an excitation unit wound with each of the coils and an acting unit configured to be magnetically coupled to the excitation unit and cause a magnetic flux applied from the excitation unit to work on the permanent magnet of the movable element,
   wherein the excitation unit is arranged to be spaced apart from the acting unit,
   wherein the plurality of coils and the excitation unit are arranged outside the chamber, and
   wherein the acting unit is arranged inside the chamber.

2. The production apparatus according to claim 1, wherein the excitation unit and the acting unit are opposed to each other across the chamber.

3. The production apparatus according to claim 1,
   wherein the excitation unit is connected to an outside of a partition wall of the chamber, and
   wherein the acting unit is connected to an inside of the partition wall of the chamber.

4. The production apparatus according to claim 1, wherein the chamber is a decompression chamber.

5. The production apparatus according to claim 1, wherein the movable element is configured to be movable in the first direction while floating with respect to the stator.

6. A method of fabricating an article comprising:
   transporting a workpiece by the movable element of a production apparatus according to claim 1, and
   performing a processing operation on the workpiece.

* * * * *